US012213944B1

(12) United States Patent
Wu et al.

(10) Patent No.: US 12,213,944 B1
(45) Date of Patent: Feb. 4, 2025

(54) FLUID TRANSFER DEVICE

(71) Applicant: Genzyme Corporation, Cambridge, MA (US)

(72) Inventors: Haiming Wu, Weston, MA (US); Danial Ferreira, Woodbridge, CT (US)

(73) Assignee: GENZYME CORPORATION, Shelton, CT (US)

( * ) Notice: Subject to any disclaimer, the term of this patent is extended or adjusted under 35 U.S.C. 154(b) by 0 days.

(21) Appl. No.: 18/666,279

(22) Filed: May 16, 2024

(51) Int. Cl.
*A61J 1/20* (2006.01)
*A61J 1/14* (2023.01)

(52) U.S. Cl.
CPC ............. *A61J 1/201* (2015.05); *A61J 1/1406* (2013.01); *A61J 1/2058* (2015.05); *A61J 1/2096* (2013.01)

(58) Field of Classification Search
CPC .. A61J 1/20; A61J 1/201; A61J 1/2017; A61J 1/2048; A61J 1/2058; A61J 1/2062; A61J 1/1406; A61J 1/2096
See application file for complete search history.

(56) References Cited

U.S. PATENT DOCUMENTS 4,997,430 A * 3/1991 Van der Heiden ... A61M 5/162 604/405
5,466,220 A * 11/1995 Brenneman ........... A61J 1/2089 604/87
6,474,375 B2 * 11/2002 Spero .................... A61J 1/2089 604/416
6,558,365 B2 * 5/2003 Zinger .................. A61J 1/2096 141/330
7,326,194 B2 * 2/2008 Zinger .................. A61J 1/2089 604/410
7,896,849 B2 * 3/2011 Delay ................... A61J 1/2089 604/82

(Continued)

FOREIGN PATENT DOCUMENTS

WO WO 2004/068820 A2 8/2004
WO WO 2005/018629 A1 3/2005

(Continued)

OTHER PUBLICATIONS

Hamers-Casterman et al., "Naturally occurring antibodies devoid of light chains," Nature, Jun. 3, 1993, 363(6428):446-448.

(Continued)

*Primary Examiner* — Philip R Wiest
(74) *Attorney, Agent, or Firm* — Fish & Richardson P.C.

(57) ABSTRACT

A fluid transfer device includes a body, a first connecting portion comprising a first fluid channel to fluidically communicate with an interior of the diluent container, a second connecting portion comprising a second fluid channel to fluidically communicate with an interior of a medicament container, and a third fluid channel to fluidically communicate with a pump device. In a first configuration, the first fluid channel is fluidically coupled to the third fluid channel, and the third fluid channel is fluidically coupled to the second fluid channel to prevent a flow of fluid from the third fluid channel into the first fluid channel. In a second configuration, the second fluid channel is fluidically coupled to the third fluid channel, and the third fluid channel is fluidically coupled to the first fluid channel to prevent a flow of fluid from the third fluid channel into the second fluid channel.

13 Claims, 7 Drawing Sheets

(56) References Cited

U.S. PATENT DOCUMENTS

| | | | | |
|---|---|---|---|---|
| 8,425,487 | B2 | 4/2013 | Beiriger et al. | |
| 8,562,584 | B2 | 10/2013 | Beiriger et al. | |
| 9,132,061 | B2 | 9/2015 | Beiriger | |
| 9,339,438 | B2 | 5/2016 | Lev et al. | |
| 9,345,643 | B2 * | 5/2016 | Okiyama .............. | A61J 1/2096 |
| 10,420,927 | B2 * | 9/2019 | Fangrow ............... | A61J 1/2068 |
| 10,688,295 | B2 | 6/2020 | Lev et al. | |
| 10,765,604 | B2 * | 9/2020 | Denenburg ........... | A61J 1/2075 |
| 10,945,921 | B2 | 3/2021 | Denenburg | |
| 11,642,285 | B2 * | 5/2023 | Denenburg ........... | A61J 1/1406<br>604/405 |
| 11,786,443 | B2 | 10/2023 | Lev et al. | |
| 2011/0087164 | A1 * | 4/2011 | Mosler .................. | A61J 1/2089<br>604/87 |
| 2019/0381237 | A1 * | 12/2019 | Desbrosses ........... | A61J 1/2013 |
| 2021/0154097 | A1 | 5/2021 | McLoughlin et al. | |
| 2021/0228446 | A1 * | 7/2021 | Herrmann ............. | A61J 1/2058 |
| 2023/0052165 | A1 | 2/2023 | Bar-El et al. | |

FOREIGN PATENT DOCUMENTS

| | | | |
|---|---|---|---|
| WO | WO 2006/003388 | A2 | 1/2006 |
| WO | WO 2006/030220 | A1 | 3/2006 |
| WO | WO 2007/017868 | A1 | 2/2007 |
| WO | WO 2020/208626 | A1 | 10/2020 |

OTHER PUBLICATIONS

Holt et al., "Domain antibodies: proteins for therapy," Trends in Biotechnology, Nov. 2003, 21(11):484-490.

Muyldermans, "Single domain camel antibodies: current status," Reviews in Molecular Biotechnology, Jun. 2001, 74(4):277-302.

Needle-based injection systems for medical use Requirements and test methods, Part 1: Needle injection systems, Iso 11608-1:2014(E), Third Edition, Switzerland, ISO, Dec. 15, 2014, pp. 1-13.

Ward et al., "Binding activities of a repertoire of single immunoglobulin variable domains secreted from *Escherichia coli,*" Nature, Oct. 1, 1989, 341(6242):544-546.

U.S. Appl. No. 18/666,320, filed May 16, 2024, Haiming Wu.

U.S. Appl. No. 18/666,379, filed May 16, 2024, Haiming Wu.

U.S. Appl. No. 18/666,417, filed May 16, 2024, Haiming Wu.

* cited by examiner

FLUID TRANSFER DEVICE

TECHNICAL FIELD

The present disclosure relates to the field of fluid transfer devices, specifically, to fluid transfer devices configured for transferring a fluid between a diluent container and a medicament container, e.g., for preparing or reconstituting a liquid medicament and/or for administering a medicament by way of injection or infusion. In another aspect the present disclosure relates to a kit comprising a fluid transfer device. In still another aspect the disclosure relates to methods of transferring a fluid between a diluent container and a medicament container, e.g., for the purpose of preparing a reconstitutable medicament, for reconstituting a reconstitutable medicament and/or for administering a reconstituted liquid medicament.

BACKGROUND

Patients suffering from certain diseases like, for example, haemophilia or requiring enzyme replacement therapy have to take regular intravenous (IV) infusions. The infusions often have to be mixed and prepared, sometimes to the specific needs of the patient, (and sometimes a short time before drug administration) which may include reconstitution of the drug powder from multiple vials using an exact amount of sterile liquids like water and/or saline. As this preparation process is typically complex and tedious, it is usually performed by a health care professional in a clinic or pharmacy, potentially using lab equipment.

Generally, administering a medicament by way of infusion may require a rather clean or sterile environment. A patient may therefore have to regularly visit an ambulance or health care center.

Self-medication or home-medication for administering a medicament through infusion or injection is and remains quite challenging but is very attractive for patients thereby avoiding problems and circumstances involved in visiting a health care center. With home- or self-medication a patient or user, e.g. intending to establish a vascular access to a patient's body, may be obliged to use only one hand, which might be rather cumbersome and thus challenging.

In addition, it is often required to establish or maintain a clean and/or sterile environment especially in the field of home-medication or self-medication as well as providing of a clean and sterile storage environment for medicaments and medicament containers, medical device accessory and medical devices.

It is therefore desirable to provide improvements in the field of home medication or self-medication, which allow a user or caregiver to prepare and to administer a medicament by way of injection or infusion. It is further desirable to provide an improved storage and transportation of medical devices, medicaments, medical device accessory and the like components required for home- or self-medication. Furthermore, there should be provided improvements in guiding and assisting a user in conducting or executing numerous steps in the course of preparing medicaments and/or in the course of preparing administering of a medicament, e.g. by way of infusion or injection.

Some medicaments to be administered by injection or infusion may be provided in a co-called injection vial, either in liquid or powdered form. Such injection vials typically comprise a barrel filled with the medicament either in a liquid or powdered form. The barrel is typically sealed towards an outlet by a pierceable stopper. The pierceable stopper may be fixed to a barrel head, which may also provide a mechanical fastening for a vial adapter.

Vial adapters are widely known in the art and may provide a well-defined fastening to the barrel head of an injection vial. They may comprise a spike to penetrate the pierceable stopper sealing the outlet of the injection barrel. The spike is typically in fluid communication with a connector, e.g. implemented as a standardized connector that may provide a mechanical fastening of an injection device so that the liquid content provided inside the injection vial can be withdrawn by the injection device, e.g. by a syringe or the like medicament container connectable to the vial adapter.

Controlling of an amount of a diluent to be withdrawn from a diluent container and/or controlling of an amount of reconstituted liquid medicament to be introduced into a diluent container or into one of an infusion container or medicament delivery container might be elaborate. Generally, a syringe may be used for withdrawing a well-defined amount of a diluent from a diluent container and to introduce a well-defined amount of the diluent into a medicament container for reconstituting the medicament. Use of a separate syringe for withdrawing and expelling liquid substances requires respective skills of an operator or user. Also, connecting and disconnecting a syringe with regard to diluent containers or medicament containers may be always accompanied by a non-neglectable risk of contamination. It is therefore desirable to improve a transfer of a fluid between a diluent container and a medicament container for both, reconstituting a medicament and for providing the reconstituted medicament to a delivery assembly, a delivery device or to an infusion container, such as an infusion bag.

The above-mentioned disadvantages and shortcomings are solved by a fluid transfer device, by a kit, e.g. implemented as an infusion kit, and by methods of transferring a fluid between a diluent container and a medicament container in accordance to the features of the independent claims. Various examples and embodiments are subject matter of the dependent claims, respectively.

SUMMARY

In one aspect there is provided a fluid transfer device for transferring a fluid between a diluent container and a medicament container. The fluid transfer device comprises a body. The fluid transfer device further comprises a first connecting portion to connect to the diluent container. The first connecting portion comprises a first fluid channel to fluidically communicate with an interior of the diluent container, specifically, when the first connecting portion of the fluid transfer device is connected to the diluent container. The fluid transfer device further comprises a second connecting portion to connect to the medicament container. The second connecting portion comprises a second fluid channel to fluidically communicate with an interior of the medicament container, specifically, to communicate with the interior of the medicament container when the second connecting portion of the fluid transfer device is connected to the medicament container.

The fluid transfer device further comprises a third fluid channel to fluidically communicate with a pump device. The fluid transfer device is reconfigurable between a first configuration and a second configuration. In some examples the fluid transfer device is switchable between the first configuration and the second configuration. The fluid transfer device may be manually switchable, e.g. by a user or operator of the fluid transfer device. This way, a user is given the possibility to switch the fluid transfer device from a first configuration into a second configuration and/or to switch the fluid transfer device from the second configuration into the first configuration.

In the two alternative configurations the fluid transfer device provides different fluid transferring couplings between the first fluid channel, the second fluid channel and the third fluid channel.

In the first configuration of the fluid transfer device the first fluid channel is fluidically coupled to the third fluid channel to support a flow of fluid from the first fluid channel into the third fluid channel. In addition and in the first configuration the third fluid channel is also fluidically coupled to the second fluid channel to support a flow of fluid from the third fluid channel into the second fluid channel. Here, the fluid channels are configured to prevent a flow of fluid from the third fluid channel into the first fluid channel. Hence, in the first configuration there is only supported a flow of fluid from the first fluid channel towards and into the third fluid channel whereas an opposite direction of flow, namely from the third fluid channel back into the first fluid channel it effectively blocked and prevented. Rather, a fluid provided to the third fluid channel, e.g. by the pump device may be transferred or directed from the third fluid channel to the second fluid channel.

When in the second configuration of the fluid transfer device the second fluid channel is fluidically coupled to the third fluid channel to support a flow of fluid from the second fluid channel into the third fluid channel. In addition, and when in the second configuration the third fluid channel is fluidically coupled to the first fluid channel to support a flow of fluid from the third fluid channel into the first fluid channel and to prevent a flow of fluid from the third fluid channel into the second fluid channel.

When in the first configuration there may be provided a unidirectional and direct fluid communication from the first fluid channel to the third fluid channel. There may be further provided a unidirectional and direct fluid communication from the third fluid channel into the second fluid channel. In the first configuration there might be no direct fluid communication between the first and the second fluid channel. Moreover, in the first configuration it may be only possible to direct a flow of fluid from the first fluid channel towards the third fluid channel, e.g. by applying a negative pressure to the third fluid channel. When applying a positive pressure to the third fluid channel in an opposite direction a respective flow of fluid may be redirected into the second fluid channel and hence towards or into the medicament container connectable or connected to the second fluid channel.

When in the second configuration a rather opposite scenario of fluid flow in the interconnection between first, second and third fluid channels may be provided. When in the second configuration there may be no direct fluid communication between the second fluid channel and the first fluid channel. There may be provided a unidirectional and direct fluid communication between the second fluid channel towards and into the third fluid channel. Typically, there may be induced a respective flow of fluid from the second fluid channel towards and into the third fluid channel by applying a negative pressure to the third fluid channel. When applying an opposite, hence a positive pressure to the third fluid channel, e.g. by way of a fluid present to the third fluid channel the respective flow of fluid will be directed into the first fluid channel while the second fluid channel is effectively decoupled from the first fluid channel.

The reconfigurable fluid transfer device provides a two-fold function. According to a first function provided in the first configuration of the fluid transfer device there will be established a flow of fluid from the first fluid channel, e.g., in fluid communication with an interior of the diluent container, towards and into the third fluid channel, e.g., in response to a negative pressure applied to the third fluid channel. In this way, an amount of a fluid or liquid substance originally contained in the diluent container can be withdrawn out of the diluent container through the first fluid channel and into the third fluid channel towards and/or into the pump device. Withdrawing of an amount of the fluid from the diluent container towards and/or into the pump device may be conducted during or due to a first stroke of the pump device.

During and/or due to a second stroke of the pump device, by way of which at least a portion of the amount of fluid previously provided to the pump device, can be expelled into the third fluid channel, which due to its fluidic coupling with the second fluid channel then transfers the amount of the liquid into the second fluid channel and into the interior of the medicament container. Here, a first stroke of the pump device may apply a negative pressure to the third fluid channel. A second stroke of the pump device may provide a positive pressure and hence an expelling effect to the third fluid channel by way of which an amount of the fluid previously withdrawn from the diluent container may be expelled into the third fluid channel in a direction towards the first fluid channel and hence in a direction opposite to a direction of flow during the first stroke.

According to some examples the pump device may be operable to apply a first stroke and a second stroke of different direction. During a first stroke there may be applied a negative pressure to the third fluid channel, which provides a suction effect to the third fluid channel and which suction effect may cause withdrawal of the fluid from the diluent container in response to the negative pressure. An oppositely directed pressure, e.g. by expelling an amount of a fluid from the pump device back into the third fluid channel may then be directed into the second fluid channel and hence into the medicament container.

Accordingly, and when the fluid transfer device is in the first configuration it is particularly operable to withdraw an amount of a diluent from the diluent container when the diluent container is duly attached to the first connecting portion and when the first fluid channel is fluidically connected to the interior of the diluent container. Withdrawing of the fluid from the diluent container may provide or may cause a flow of fluid from the diluent container into the first fluid channel towards and into the third fluid channel and further into the pump device.

Subsequently, the operation of the pump device may be inverted. During a subsequent second stroke, the pump device may be used to expel the fluid from the pump device back into the third fluid channel. Here and when the medicament container is in the first configuration such a supply of a fluid into the third fluid channel on the basis of a positive pressure relates to a transfer of the respective fluid from the third fluid channel into the second fluid channel and hence into the medicament container when duly attached to the second fluid channel. In this way a diluent can be withdrawn from the diluent container and can be expelled or introduced into the medicament container without the necessity to disconnect a pump device or to reconnect the pump device from any of the fluid channels.

When in the second configuration applying a negative pressure to the third fluid channel, e.g. by way of a first stroke of the pump device, may cause a respective transfer of the negative pressure to the second fluid channel. Accordingly, a liquid substance, e.g. a reconstituted medicament located inside the medicament container may be withdrawn into the second fluid channel and further into the third fluid channel and even further into the pump device. During a subsequent second stroke the pump device may be again used to apply a positive pressure and to supply the fluid previously withdrawn from the medicament container back into the third fluid channel.

When supplying a fluid with positive pressure to the third fluid channel, e.g., by the pump device, the respective fluid will be transferred back into the first fluid channel and into a container fluidically connected to an opposite end of the first fluid channel. In this way and when the diluent container is or remains connected to the first fluid channel the fluid as provided or supplied by the pump device and as expelled into the third fluid channel may be transferred into the first fluid channel and hence into the diluent container or into a respective infusion bag.

Here and in the second configuration of the fluid transfer device the fluid transfer device may be of particular use or benefit to withdraw a liquid substance or a liquid reconstituted medicament from the medicament container via the second fluid channel and to expel or to direct the withdrawn liquid substance into the first fluid channel and hence into the diluent container duly connected to the first fluid channel in a fluid transferring manner.

By switching the fluid transfer device between the first configuration and the second configuration its mode of operation can be selectively switched between different a diluent withdrawing mode corresponding to the first configuration, and a drug withdrawing mode corresponding to the second configuration. In the first configuration the fluid transfer device particularly provides withdrawal of a diluent from the diluent container and supplying the diluent into the medicament container. When in the second configuration the fluid transfer device provides withdrawing of a liquid substance, e.g. a liquid reconstituted medicament from the medicament container and supplying the withdrawn liquid substance or medicament into the diluent container.

The different operation modes by way of which a liquid can be withdrawn from the diluent container and supplied into the medicament container and by way of which the medicament can be withdrawn from the medicament container can be supplied back to the diluent container may not require any disconnection or reconnection of the diluent container, the medicament container and the pump device from or to the fluid transfer device. In this way, a risk of contamination of the diluent or medicament can be reduced. In the same way, a general handling and operation for providing a transfer of a well-defined amount of a diluent or reconstituted medicament between the diluent container, the pump device and the medicament container can be controlled rather easily and in a straightforward manner.

At the same time, the fluid transfer device may comprise a rather compact design and may provide an intuitive use, e.g., for switching between the first configuration and the second configuration.

According to a further example the fluid transfer device comprises a first body part and a second body part, wherein the first body part is movable relative to the second body part and/or wherein the second body part is movable relative to the first body part. By moving the first body part and the second body part, the fluid transfer device can be transferred between the first configuration and the second configuration. The first body part and the second body part may both form part of the body of the fluid transfer device. In some examples the body of the fluid transfer device comprises only two components, namely the first body part and the second body part. The first body part and the second body part may be in a sliding or rotational engagement in order to enable a well-defined and guided movement between the first body part and the second part the part.

By way of a first and a second body parts, which may be movably connected to each other there can be provided a well-defined switching or reconfiguration of the fluid transfer device.

According to a further example the first body part is movable relative to the second body part along a first direction to transfer the fluid transfer device from the first configuration into the second configuration. Here, the first body part is movable relative to the second body part along a second direction, which is opposite to the first direction in order to transfer the fluid transfer device from the second configuration into the first configuration. Both, the first configuration as well as the second configuration may be characterized by stop features that are provided on at least one of the first body part and the second body part. Here, the first body part may comprise a first stop feature and the second body part may comprise a second stop feature.

When the first and second stop features mutually engage a movement of the first body part relative to the second body part along the first direction or along the second direction may be impeded or blocked. In this way, the first and second stop features may provide a haptic feedback to a user, that at least one of the first configuration or second configuration has been reached. In addition, mutually corresponding stop features provided at or on the first body part and the second body part, respectively, may define or maintain a well-defined first or second configuration of the fluid transfer device.

In addition, by way of at least one first stop feature on the first body part and by way of at least a second stop feature on the second body part there may be provided a limited relative movement between the first body part and the second body part. When first and second stop features mutually engage the first and second body part may be in a relative position that defines one of the first configuration and the second configuration.

According to further examples there may be provided two first stop features on or at the first body part and/or may be further provided two second stop features on the second body part. Engagement of one of the two first stop features and one of the two second stop features may define the first configuration of the fluid transfer device. Mutual engagement of the other one of the two first stop features and/or engagement of the other one of the two second stop features may define or control the second configuration of the fluid transfer device.

According to a further example the first body part is movable relative to the second body part along a first direction to transfer the fluid transfer device from the first configuration into the second configuration. The first body part may be further movable relative to the second body part along the first direction to transfer the fluid transfer device from the second configuration back into the first configuration. This example may particularly apply, where the first body part and the second body part are rotationally engaged. When one of the first body part and the second body part is subject to a complete revolution or turn relative to the other one of the first body part and the second body part the fluid transfer device may have returned into an initial configuration, e.g. in the first configuration. Rotating of the first body part relative to the second body part by an angle of 180° may then lead to the second configuration of the fluid transfer device.

In any of the first and the second configurations the first and the second body part may acoustically and/or or haptically engage so as to indicate to a user, that any one of the first configuration and the second configuration has been reached. Here, one of the first body part and the second body part may comprise a snap feature to engage with a complementary-shaped counter snap feature of the other one of the first body part and the second body part. The snap feature and the counter snap feature may be arranged and configured such that the respective snap features and counter snap features engage positively, acoustically and/or haptically when one of the first and the second configurations has been reached.

In this way, there is provided an intuitive control for a user or operator of the fluid transfer device to transfer the respective device into one of the first configuration and the second configuration.

According to a further example the first body part defines a longitudinal axis. The second body part is rotatable relative to the first body part with the longitudinal axis as an axis of rotation. In some examples the first body part may comprise one of an insert portion or a receptacle engaged with a complementary shaped insert portion or receptacle of the second body part. In this way there may be provided a rotational engagement between the first body part and the second body part.

In some examples it may be the first body part that comprises an elongated geometry of e.g. cylindrical shape that defines the longitudinal axis. The first body part may comprise a sleeve or a sleeve-shaped design. It may be then the second body part that is rotatable relative to the first body part with the longitudinal axis as an axis of rotation. Here, the second body part may comprise a receptacle to receive a cylindrically-shaped or tubularly-shaped sidewall of the first body part. The first body part and the second body part may be arranged in a nested or interleaved or coaxial configuration.

According to a further example the first body part comprises the first fluid channel. The second body part comprises at least one of the second fluid channel and the third fluid channel. By providing at least one of the second fluid channel and the third fluid channel in the second body part, the respective fluid channel, i.e., at least one of the second fluid channel and the third fluid channel can be selectively connected or disconnected from the first fluid channel simply by moving the second body part relative to the first body part.

According to a further example the second body part comprises the second fluid channel and the third fluid channel. Here, the first fluid channel and the second fluid channel may be fixed relative to each other. A movement of the second body part relative to the first body part then leads to a simultaneous movement of both, the second fluid channel and the third fluid channel relative to the first fluid channel.

In a further example the body comprises a first transfer channel, e.g., inside the body and extending along or parallel to the longitudinal axis as defined by the first body part. The first transfer channel comprises a first passageway comprising a proximal end merging into the first fluid channel and further comprising a distal end connectable to the third fluid channel. Here, the distal end and the proximal end are opposite longitudinal ends of the first passageway. The first transfer channel further comprises a first branch section merging into the first passageway. The first branch section is further connectable to the second fluid channel of the fluid transfer device. The first branch section may be selectively connectable to the second fluid channel.

In some examples the first branch section may be in fluid communication with the second fluid channel only when the fluid transfer device is in the first configuration. When in the second configuration the first branch section may be disconnected or decoupled from the second fluid channel.

Likewise, the first passageway may be only and exclusively connected or connectable to the third fluid channel when the fluid transfer device is in the first configuration. When in the second configuration the first passageway may be disconnected from the third fluid channel. In this way there can be provided a selective connection and disconnection, hence a selective fluid coupling of fluidic decoupling between the first fluid channel, the second fluid channel and the third fluid channel depending on the respective first or second configuration of the fluid transfer device.

According to a further example the first body part comprises the first transfer channel. Here, the first transfer channel may be implemented as a bore extending through or inside the first body part. The proximal longitudinal end of the first passageway of the first transfer channel may merge into the first fluid channel. An opposite distal longitudinal end of the first passageway of the first transfer channel may be selectively connectable to the third fluid channel.

According to a further example and when the fluid transfer device is in the first configuration the distal end of the first passageway is in flow connection with the third fluid channel and the first branch section of the first transfer channel is in flow connection with the second fluid channel. The respective flow connection may be unidirectional. Here and according to a further example the flow connection between the distal end of the first passageway and the third fluid channel may be configured to support a flow of fluid from the first passageway into the third fluid channel and may be effective to block a flow of fluid from the distal end of the first passageway towards or into the proximal end of the first passageway or back into the first fluid channel.

Rather, a respective flow of fluid, e.g., entering the third fluid channel from its distal end may be then directed into the first branch section, which may support a flow of fluid from the third fluid channel and hence from the distal end of the first passageway towards and into the second fluid channel.

According to a further example and when the fluid transfer device is in the second configuration the distal end of the first passageway is disconnected from the third fluid channel and the first branch section is disconnected from the second fluid channel. In this way a withdrawal of fluid from or through the first fluid channel towards and into the third fluid channel is effectively blocked. Likewise, a flow of fluid from any one of the first and the third fluid channels back into the second fluid channel may be effectively blocked as well.

According to a further example the first passageway comprises a first check valve located between the distal end of the first passageway and the first branch section. The first check valve is configured to support a flow of fluid from the proximal end towards the distal end of the first passageway and to block a flow of fluid from the distal end towards the proximal end of the first passageway. By way of the first check valve it can be provided that a fluid can be only withdrawn from the diluent container via the first passageway and via the first fluid channel only in a suction mode, i.e. when a negative pressure is applied to the third fluid channel or when a positive expelling pressure would be applied from the first fluid channel.

An oppositely directed pressure, hence a positive pressure provided to the third fluid channel may not lead to a reintroduction of a fluid previously withdrawn from the diluent container directly back into the diluent container. Rather and by way of the first check valve the first passageway is effectively closed or blocked towards the proximal end for any flow of fluid entering the first passageway with a positive pressure from its distal end. The respective fluid provided or supplied into the third fluid channel and hence entering the distal end of the first passageway may be forced to enter the first branch section and may be thus directed towards and into the second flow channel and further into the medicament container.

According to a further example the first branch section comprises a second check valve, which is configured to support a flow of fluid from the first passageway into the first branch section and to block a flow of fluid from the first branch section into the first passageway. The second check valve may be operable to prevent withdrawal of a content of the medicament container when the first passageway is subject to a negative pressure. The second check valve may be configured to allow a unidirectional flow of a fluid from the first passageway only towards and into the second fluid channel but is effective to prevent a respective counter directed flow.

In this in this way and when the fluid transfer device is in the first configuration it can be provided that a fluid is only allowed to enter the second fluid channel and hence to enter the medicament container. But any withdrawal of a substance, e.g. of a fluid from the medicament container may be effectively blocked or prevented.

According to a further example the body comprises a second transfer channel, wherein the second transfer channel comprises a second passageway comprising a proximal end merging into the first fluid channel and a distal end connectable to the third fluid channel. The second transfer channel further comprises a second branch section merging into the second passageway and which second branch section is connectable to the second fluid channel. The second transfer channel, specifically the second passageway may extend parallel to the first transfer channel, specifically parallel to the first passageway of the first transfer channel.

The first branch section may extend in a first direction, e.g. in a first radial direction as seen with regard to a longitudinal direction of the first passageway. Likewise, the second branch section may extend along a second direction, e.g., along a second radial direction as seen with regard to the longitudinal direction of the second passageway. The first radial direction and the second radial direction may be opposite radial directions. In this way, the ends of the first and the second branch sections facing away from the respective first and second passageways may be located at opposite portions, e.g. at opposite sidewall sections of the first body part of the body of the fluid transfer device.

In this way and depending on the respective configuration of the fluid transfer device the second flow channel may be alternately connectable with only one of the first branch section and the second branch section.

Typically, and according to a further example the first body part comprises the second transfer channel. The first transfer channel and the second transfer channel may be provided both inside the first body part of the fluid transfer device.

Accordingly, the first transfer channel and the second transfer channel may be immobile relative to each other.

According to a further example and when the fluid transfer device is in the second configuration the proximal end of the second passageway is in flow connection with the third fluid channel. The second branch section is in flow connection with the second fluid channel. In this way and when in the second configuration there may be provided a unidirectional fluid coupling between the proximal end of the second passageway and the third fluid channel. Likewise, there may be provided a unidirectional fluid coupling between the second fluid channel and the second branch section. Typically, and when in the second configuration the fluid coupling between the proximal end of the second passageway and the third fluid channel may exclusively provide a flow of fluid from the second passageway into the third fluid channel when a negative pressure is applied to the third fluid channel.

Also, the fluid coupling between the second branch section and the second fluid channel may provide a unidirectional flow of a fluid from the second fluid channel into the second branch section and further into the second passageway. In this way it may be provided that when a negative pressure is applied to the third fluid channel there may arise a withdrawal of a fluid the from or via the second fluid channel into the second branch section and further into the second passageway towards the distal end of the second passageway and further into the third flow channel and/or into the pump device fluidically connected to the third flow channel.

When an oppositely directed positive pressure is applied to the third fluid channel the fluid connection between the third fluid channel and the second passageway may provide a unidirectional flow of fluid from the distal end of the second passageway towards the proximal end of the second passageway while effectively preventing or blocking a respective flow of fluid from the second passageway back into the second branch section. In this way and when the fluid transfer device is in the second configuration a supply of a liquid or fluid into the second fluid channel and/or into the medicament container fluidically connected to the second fluid channel is effectively prevented or blocked.

According to a further example the second passageway comprises a third check valve located between the distal end of the second passageway and the second branch section. The third check valve is configured to support a flow of fluid from the proximal end towards the distal end of the second passageway. The third check valve is further configured to block a flow of fluid from the distal end towards the proximal end of the second passageway.

In this way and by way of the third check valve it can be effectively provided that application of a negative pressure to the proximal end of the second passageway does not lead to an ingress or withdrawal of a fluid from the first fluid channel. However, the third check valve supports and allows expelling of a fluid to the second passageway and hence from the third fluid channel back into the first fluid channel and hence into the diluent container.

According to a further example the second branch section comprises a fourth check valve, which is configured to support a flow of fluid from the second passageway into the second branch section and to block a flow of fluid from the second branch section into the second passageway. By way of the fourth check valve it can be provided that application of a negative pressure to the third fluid channel leads to the withdrawal of an amount of a fluid from the second fluid channel into the second passageway towards the proximal end of the second passageway. Applying a positive pressure in an opposite sense, i.e., applying a fluid pressure from the third fluid channel towards and into the proximal end of the second passageway does not lead to a respective supply or flow of a fluid into the second predetermined. Rather, the fourth check valve effectively prevents ingress or a supply of a fluid from the distal end of the second passageway into the second fluid channel. Rather, a respective flow of fluid applied with positive pressure to the third fluid channel transfers into a respective flow of fluid into the first channel via the third check valve.

The first check valve and the third check valve may be oppositely oriented. Hence, the first check valve may provide a flow of fluid from the first fluid channel towards and into the third fluid channel. The first check valve may block an oppositely directed flow of fluid, e.g., a flow of fluid from the third fluid channel towards and into the first fluid channel.

The third check valve may provide a flow of fluid from the third fluid channel back into the first fluid channel. The third check valve is configured to block a flow of fluid from the first fluid channel into the third fluid channel.

Likewise, the second and fourth check valves are also oppositely configured. The second check valve is configured to support a fluid flow from the first passageway into the second flow channel and to prevent or to block a flow of fluid from the second flow channel into the first passageway. Complementary, the fourth check valve provides a flow of fluid from the second fluid channel into the second passageway. It may effectively prevent a flow of fluid from the second passageway into the second fluid channel.

In a further example and when the fluid transfer device is in the first configuration the second fluid channel is fluidically connected to the first branch section and the third fluid channel is connected to the distal end of the first passageway. The second passageway is disconnected from both, the second fluid channel and the third fluid channel. In the second configuration it is the second passageway, specifically, the distal end of the second passageway that is in fluid communication with the third fluid channel. Here and in the second configuration it is also the second branch section that is in flow communication of flow connection with the second fluid channel. In the second configuration the first passageway is disconnected from the third fluid channel and the first branch section is disconnected from the second fluid channel.

According to a further example the first connecting portion comprises a diluent container spike, which is configured to penetrate a pierceable seal of the diluent container. The first fluid channel extends into or through the diluent container spike. The first fluid channel may at least partially overlap with a lumen of the diluent container spike. In some examples the diluent container spike may be an integral part of the first body part. It may form or constitute the first body part. The diluent container spike may comprise an elongated shaft extending in the longitudinal direction. A proximal end of the diluent container spike may comprise a tipped end configured to pierce the pierceable seal of the diluent container. A distal end of the diluent container spike and/or a distal end of the first body part may be located in a cup-shaped receptacle of the second body part.

In some examples the second fluid channel and/or the second connecting portion may protrude transversal from a cup-shaped receptacle of the second body part. The second body part may comprise a tubularly-shaped sidewall with the second connecting portion and/or the second fluid channel extending in a radial direction outwardly from the sidewall of the second body part.

In some examples the third fluid channel may extend parallel to the first fluid channel. It may substantially flush with the first fluid channel or may even radially overlap with the first fluid channel. The third fluid channel is longitudinally separated from the first fluid channel. Typically, the first and second transfer channels are located longitudinally between the first fluid channel and the third fluid channel. The first and second transfer channels may provide a bridging portion between the first fluid channel and the third fluid channel.

A diameter of the first fluid channel may be larger than a diameter of the third fluid channel. The third fluid channel may be movable relative to the first fluid channel, e.g. by moving the second body part relative to the first body part. Here, the third fluid channel may be provided in or inside the second body part. In some examples, the first and/or the second passageway may be located longitudinally between the first fluid channel and the third fluid channel. Specifically, the first passageway and/or the second passageway may be located between a distal end of the first fluid channel and a proximal end of the third fluid channel. The first and/or second passageways may extend parallel to each other. They may be located radially or transversely offset from each other in a non-overlapping configuration. Both passageways, i.e., the first passageway and the second passageway may be in permanent fluid connection with the first fluid channel.

The second body part, which may be provided with the third fluid channel may be movable between the first and the second configurations or between a first and a second position. In a first position the third fluid channel outlines and fluidically communicate with the first passageway. In the second position or in the second configuration the third fluid channel aligns or fluidically connects with the second passageway. In some examples the third fluid channel is only and exclusively connectable or fluidically engageable with only one of the first passageway and the second passageway. In this way, the fluid transfer device can be switched between the first and the second configurations to control a desired flow of fluid between the first fluid channel, the second fluid channel and the third fluid channel.

According to a further example the second connecting portion comprises a medicament container spike configured to penetrate a pierceable seal of the medicament container.

In some examples the diluent container comprises a flexible bag comprising one or several pliable sheets of material, which may be welded together along a circumferential seam. In some examples the medicament container comprises a solid barrel, e.g. a vitreous barrel comprising a tubular shape. The medicament container may comprise an outlet, which may be provided at a barrel head of the medicament container. In some examples the barrel comprises a tubular sidewall extending into a radially narrowing shoulder portion toward the outlet end. The shoulder portion may in turn extend into a slightly radially widened head. The widened head may be provided with a pierceable seal, stopper or septum.

The medicament container spike may comprise a cannula, e.g. in form of a tipped needle with a hollow through bore, which may be fluidically connected with the second fluid channel. The diameter of the medicament container spike may be smaller than the diameter of the diluent container spike.

In some examples the diluent container spike may comprise a plastic material. The medicament container spike may be also made of a plastic material. Both, the diluent container spike and the medicament container spike may be provided or formed by an injection molded plastic component.

According to a further example the second connecting portion comprises a receptacle to receive a barrel or a barrel head of the medicament container. The receptacle may be formed as a cap-shaped receptacle. It may comprise a top or bottom portion, which may form or constitute a longitudinal stopper, which is operable to limit a longitudinally directed insert motion of the barrel head into the receptacle of the second connecting portion. The receptacle may be configured to engage with the barrel head mechanically. In some examples the receptacle may be configured to form a friction fit with the barrel head. In further examples the receptacle may be configured to form a snap fit engagement with the barrel or barrel head of the medicament container. In this way, the medicament container may be fixed to the second connecting portion.

In some examples the receptacle and the barrel head may be configured to form a snap fit connection allowing to fix the medicament container to the second connecting portion. Here, the mutual connection between the connecting portion and the medicament container may be of particular stability, which is sufficient to keep and to fix the medicament container fastened to the second connecting portion during, introduction of a diluent into the medicament container, conducting a well-defined reconstitution process of the medicament inside the medicament container and withdrawal of the reconstituted medicament from the medicament container.

The reconstitution process may include a well-defined mechanical treatment of the medicament container, e.g., a well-defined shaking, rolling, tumbling or twisting motion of the medicament container. Moreover, the fixing between the second connecting portion and the medicament container provides withdrawal of the reconstituted medicament through the second fluid channel towards at least one of the third fluid channel and the first fluid channel and optionally back into the diluent container.

According to a further example the receptacle comprises a sidewall. The sidewall comprises numerous sidewall segments, at least some of which comprising a snap feature to engage with the barrel head. The sidewall segments may be separated by longitudinal slits. The sidewall segments may be flexible to a certain degree in a direction perpendicular or transverse to the elongation of the medicament container spike. In this way the individual sidewall segments may provide a snap fit engagement with the stepped down section of the barrel head, i.e., where the barrel head transitions into the radial and narrowed neck portion of the barrel.

In some examples the entirety of the barrel head may be securely fastened inside the receptacle as a snap feature of the sidewall segments snaps under the barrel head. In this way there can be provided a detachable or releasable mutual fixing between the sidewall of the receptacle and the barrel head and hence between the second connecting portion and the medicament container.

According to a further example of the fluid transfer device the body comprises a third connecting portion fluidically coupled to the third fluid channel. The third connecting portion comprises a mechanical connector configured to connect with a mechanical counter connector of the pump device in a fluid transferring manner. The mechanical connector may comprise a standardized fluid transferring connector, such as one of a male or female Luer connector. The mechanical counter connector may be implemented as the other one of a male or female Luer connector. In this way, a pump device with a suitable mechanical counter connector can be detachably connected to the third connecting portion. The pump device may be configured to provide or to generate negative as well as positive pressure to the third fluid channel in order to withdraw and/or to expel a fluid the through the third fluid channel.

In some examples the mechanical connector comprises a receptacle to receive a complementary shaped protrusion of the mechanical counter connector. In some examples the receptacle of the mechanical connector comprises a tapered or conical shape. Accordingly, the mechanical counter connector comprises a conically-shaped protrusion to fit and/or to engage with the tapered or conically shaped sidewall of the receptacle of the mechanical connector.

In further examples the pump device may be integrally formed with the fluid transfer device. Here, the fluid transfer device may comprise a pump device or a pump device section, which may be integrally formed with the body of the fluid transfer device. Here, the pump device may be in integrally formed with one of the first body part and the second body part. With an integration of the pump device the fluid transfer device may be void of a third connecting portion. The pump device may be in permanent fluid coupling with the third fluid channel.

According to a further aspect the present disclosure also relates to a kit, e.g. implemented as an infusion kit. The kit comprises a fluid transfer device as described above. The kit further comprises a diluent container, which is connectable or which is connected to the first connecting portion of the fluid transfer device. The kit further comprises a medicament container, which is connectable or which is connected to the second connecting portion of the fluid transfer device. The kit further comprises a pump device, which is connectable or which is connected to the third fluid channel of the fluid transfer device. With the kit, a flow of fluid between the first, the second and the third fluid channels can be provided in a manner as described above.

Insofar and since the kit comprises a fluid transfer device as described above, all features, effects and benefits as described above in connection with the fluid transfer device equally apply to the infusion kit; and vice versa.

With the diluent container connected to the first connecting portion and the medicament container connected to the second connecting portion and with the pump device connected to the third fluid channel the kit may provide a well-defined withdrawal of a diluent from the diluent container. The fluid withdrawn from the medicament container may be provided to the third fluid channel and to the pump device, specifically, when the pump device is driven in a suction mode. Thereafter and with the fluid transfer device in its first configuration inverting the pump direction of the pump device and expelling of the previously withdrawn through the from the pump device back into the third fluid channel the respective amount of the fluid is transferred to and into the second fluid channel and hence into the medicament container.

In this way a well-defined amount of a diluent can be withdrawn from the diluent container towards and/or into the pump device and can be subsequently expelled into the medicament container without the necessity to disconnect any of the above-mentioned components.

Then, the diluent inside the medicament container may serve to dilute, to dissolve and/or to to reconstituted the medicament inside the medicament container, which may be initially provided inside the medicament container in a highly concentrated form and/or in a lyophilized state. Before, during or after completion of the reconstitution process the fluid transfer device is switched from the first configuration into the second configuration. Then and by applying a negative pressure to the third fluid channel a well-defined amount of a fluid, e.g. of a liquid reconstituted medicament, can be withdrawn from the medicament container through the second fluid channel into the third fluid channel towards and into the pump device. By inverting the pump function, e.g. by applying a positive pressure and/or by expelling the fluid previously withdrawn from the medicament container the respective amount of fluid can now be expelled into the third fluid channel and further into the first fluid channel and hence back into the diluent container, wherein the medicament may further dilute with the available diluent or solvent.

In some examples it may be of particular benefit, when the pump device can be operated to withdraw and to expel a well-defined or controllable amount of fluid from the third fluid channel and back into the third fluid channel. In this way, an amount of diluent to be withdrawn from the diluent container and to be expelled into the medicament container can be precisely controlled when the fluid transfer device is in the first configuration. When the fluid transfer device is in the second configuration an amount of medicament withdrawn from the medicament container and to be expelled into the diluent container can be controlled likewise.

According to a further example of the kit and when the fluid transfer device is in the first configuration the pump device is configured to withdraw a first amount of a fluid located in the diluent container through the first fluid channel into the third fluid channel towards or into the pump device. Furthermore, and subsequently while the fluid transfer device is in the first configuration the pump device is configured to expel at least a portion of the first amount of the fluid through the third fluid channel into the second fluid channel and into the medicament container.

Here, the entirety of the amount of the fluid initially withdrawn into the pump device can be subsequently expelled into the medicament container. Also, the entirety of the fluid previously withdrawn from the diluent container may be expelled or provided to the medicament container.

In some examples the pump device comprises a syringe, e.g. a manually operable syringe. The syringe may comprise a mechanical counter connector configured to fluidically connect to the third connecting portion of the body of the fluid transfer device. In further examples the syringe may be integrally formed with the body of the fluid transfer device. The syringe may comprise a tubular-shaped barrel and a plunger longitudinally movable relative to the barrel inside the barrel. The plunger may seal the interior of the barrel towards a direction opposite to the outlet or inlet end and hence opposite to the mechanical counter connector of the syringe or pump device.

The barrel of the syringe may be provided with a visual scale, e.g., extending along the longitudinal direction of the syringe barrel. In this way, and with a transparent or semi-transparent barrel of the syringe, the amount of a liquid drawn into the syringe barrel or expelled from the syringe barrel can be precisely controlled.

In some examples the pump device comprises a manually operable pump device. Here, a user may have to provide an operation force to generate at least one of a positive or negative pressure to the third fluid channel of the fluid transfer device. A manually operable pump device, such as a syringe, is rather easy and cost efficient to implement and may provide an immediate and intuitive control and feedback for withdrawing or expelling a liquid substance.

In some examples the pump device comprises an electromechanical pump device. Here, the pump device may comprise an electrically operated drive by way of which at least one of a positive or negative pressure can be generated, e.g., by activating the electric drive.

According to a further example and when the fluid transfer device is in the second configuration the pump device is configured to withdraw a first amount of a fluid located in the medicament container through the second fluid channel into the third fluid channel towards or into the pump device. Thereafter the pump device is configured to expel at least a portion of the first amount into the third fluid channel and further into the first fluid channel and from there into the diluent container. Here and when making use of a syringe as a pump device the amount of fluid withdrawn from the medicament container as well as the amount of fluid expelled from the pump device can be precisely controlled by an operator or user of the fluid transfer device.

In some examples the medicament container contains a lyophilized or dry-frozen medicament. The medicament container comprises a lyophilized medicament or drug inside the barrel.

In some examples the medicament container contains a liquid medicament that requires further dilution or mixing with a diluent. Here, a mixing or diluting may take place in any one of the medicament container and the diluent container. In some examples the liquid medicament may be transferred from the medicament container towards and into the diluent container. In other examples, the diluent or a portion of the diluent initially provided in the diluent container is transferred into the medicament container. Subsequently, the diluted medicament may be then re-transferred into the diluent container or into a separate administering container.

In general, the fluid transfer device and the methods as described herein can be used in connection with any two fluid containers. The fluid transfer device can be connected with its first connecting portion to a first container. It can be connected with its second connecting portion to a second container. A fluid initially located in one of the first container and the second container can be transferred into the other one of the first container and the second container, e.g., when the fluid transfer device is in its first configuration. By switching or reconfiguring the fluid transfer device from the first configuration into the second configuration a fluid or a portion of the fluid that has been transferred from the first container into the second container when the fluid transfer device is in the first configuration can then be transferred from the second container to the first container when the fluid transfer device is in the second configuration. Insofar, and by transferring the fluid transfer device between two different configurations, the direction of a fluid transfer between a first container and a second container connected to the first and to the second connecting portions of the fluid transfer device can be selectively inverted. In further examples it is even conceivable to mix multiple medicaments by transferring a liquid substance between any two containers connected to the first and to the second connecting portions of the fluid transfer device. It is even conceivable to connect numerous or several liquid containing containers or liquid receiving container to one of the first connecting portion or second connecting portion of the fluid transfer device, e.g. by making use of a fluid guiding structure, such as an infusion line, e.g., provided with a least one valve, a switch or manifold.

According to another aspect the present disclosure further relates to a method of transferring of a fluid the between a diluent container and a medicament container by using a fluid transfer device. Here, a first connecting portion of the fluid transfer device is connected to the diluent container and a second connecting portion of the fluid transfer device is connected to the medicament container in a fluid transferring manner.

Then and in a first step there is applied a negative pressure to the third fluid channel by way of which a first amount of a fluid located in the diluent container is transferred through the first fluid channel into the third fluid channel towards or into a pump device. Here, the fluid transfer device is in a configuration wherein the third fluid channel is fluidically coupled to the second fluid channel to support a flow of fluid from the third fluid channel into the second fluid channel, and to prevent a flow of fluid from the third fluid channel into the first fluid channel.

The negative pressure is typically applied by a pump device, which is fluidically connected to the third fluid channel, typically to a distal end of the third fluid channel, which is opposite to a proximal end of the third fluid channel, which proximal end is selectively connectable to one or both of the first fluid channel and the second fluid channel.

Thereafter and in a further step of the method at least a portion of the first amount of the fluid is expelled through the third fluid channel into the second fluid channel and into the medicament container. Expelling of at least a portion of the first amount of the fluid is typically conducted by the pump device. Here, the direction of flow is inverted by the pump device. In the first step the pump device is driven in a suction mode. In the second step the pump device is operated or driven in an expelling mode.

Typically, at least a portion of the first amount of the fluid, which is located inside the pump device, can be expelled into the third fluid channel in a direction opposite to a flow of fluid compared to the first step. Since the fluid transfer device is in the first configuration the fluid expelled into the third fluid channel, e.g. from the distal end into the fluid channel does not return into the first fluid channel but is redirected into the second fluid channel and hence into the medicament container.

In an optional subsequent step the diluent expelled into the medicament container may be used to dilute, to dissolve and/or to reconstitute the medicament located inside the medicament container.

Typically, the method of transferring a fluid between a diluent container and a medicament container is conducted with the fluid transfer device as described above, wherein the fluid transfer device is in the first configuration.

Since the method of transferring a fluid between a diluent container and a medicament container is conducted with a fluid transfer device as described above and and/or with a kit as described above, all features, effects and benefits as described above in connection with any of the fluid transfer device and the kit equally apply to the method of transferring the fluid between the diluent container and the medicament container; and vice versa.

According to a further aspect the present disclosure relates to another method of transferring a fluid between a diluent container and a medicament container by using a fluid transfer device. Here, a fluid transfer device is used as well but in a different configuration or in a different mode of operation. Here, the third fluid channel is fluidically coupled to the first fluid channel to support a flow of fluid from the third fluid channel into the first fluid channel and to prevent a flow of fluid from the third fluid channel into the second fluid channel.

Also here, the first connecting portion of the fluid transfer device is connected to the diluent container or to an infusion container. The second connecting portion of the fluid transfer device is connected to the medicament container. In this configuration there is applied a negative pressure to the third fluid channel and a first amount of a fluid located in the medicament container is transferred through the second fluid channel into the third fluid channel towards or into the pump device. Thereafter and in a subsequent second step at least a portion of the first amount of the fluid located in the pump device is expelled through the third fluid channel into the first fluid channel and into the diluent container or infusion container, which is connected in a fluid transferring manner to the first fluid channel.

Typically, another method of transferring a fluid between a diluent container and a medicament container is conducted with the fluid transfer device as described above, wherein the fluid transfer device is in the second configuration.

Since the further method of transferring a fluid the between the diluent container and the medicament container is to be conducted by using a fluid transfer device and/or a kit as described above, all features, effects and benefits as described above in connection with the fluid transfer device and/or as described in connection with the infusion kit equally apply to the method of transferring a fluid between the diluent container and the medicament container.

In a further example, the two above-described methods may be conducted subsequently. Hence, in a first configuration of the fluid transfer device there may be applied a negative pressure to the third fluid channel, which causes withdrawing of an amount of a diluent from the diluent container into the pump device. In a subsequent second step the amount of fluid is expelled from the pump device back into the third fluid channel. The flow of fluid is then redirected into the second fluid channel and hence into the medicament container. Subsequently, the fluid transfer device may be switched from the first configuration into the second configuration.

A repeated application of a negative pressure to the first fluid channel is then operable to withdraw an amount of fluid from the second medicament container through the second and third fluid channels into the pump device. In a further step and by inverting the pump direction of the pump device at least a portion of the previously withdrawn amount of the fluid is expelled from the pump device back into the third fluid channel, which flow of fluid is then redirected into the first fluid channel and hence into the diluent container or into an optional infusion container.

In some examples and when the fluid transfer device is operated in the second configuration it may be beneficial that the medicament container is held upside down, such that the fluid located inside the second medicament container is and remains in fluid communication with the second fluid channel, e.g. via a medicament container spike of the second connecting portion of the fluid transfer device.

Further aspects of the fluid transfer device, the kit and the methods of transferring a fluid between a diluent container and a medicament container will become apparent from the following clauses and their mutual dependencies Clause 1: A fluid transfer device (1) for transferring a fluid between a diluent container (100) and a medicament container (200), the fluid transfer device (1) comprising:

- a body (5),
- a first connecting portion (11) to connect to the diluent container (100), the first connecting portion (11) comprising a first fluid channel (10) to fluidically communicate with an interior (102) of the diluent container (100),
- a second connecting portion (21) to connect to the medicament container (200), the second connecting portion comprising a second fluid channel (20) to fluidically communicate with an interior (202) of the medicament container (200), a third fluid channel (30) to fluidically communicate with a pump device (300), wherein in a first configuration of the fluid transfer device (1):

the first fluid channel (10) is fluidically coupled to the third fluid channel (30) to support a flow of fluid from the first fluid channel (10) into the third fluid channel (30), and the third fluid channel (30) is fluidically coupled to the second fluid channel (20) to support a flow of fluid from the third fluid channel (30) into the second fluid channel (20), and to prevent a flow of fluid from the third fluid channel (30) into the first fluid channel (10), and wherein in a second configuration of the fluid transfer device (1), the second fluid channel (20) is fluidically coupled to the third fluid channel (30) to support a flow of fluid from the second fluid channel (20) into the third fluid channel (30), and the third fluid channel (30) is fluidically coupled to the first fluid channel (10) to support a flow of fluid from the third fluid channel (30) into the first fluid channel (10) and to prevent a flow of fluid from the third fluid channel (30) into the second fluid channel (20).

Clause 2: The fluid transfer device (1) according to clause 1, wherein the body (5) comprises a first body part (50) and a second body part (60) movable relative to each other to transfer the fluid transfer device (1) between the first configuration and the second configuration.

Clause 3: The fluid transfer device (1) according to clause 2, wherein the first body part (50) is movable relative to the second body part (60) along a first direction (2) to transfer the fluid transfer device (1) from the first configuration into the second configuration and wherein the first body part (50) is movable relative to the second body part (60) along a second direction (3) opposite to the first direction, to transfer the fluid transfer device (1) from the second configuration into the first configuration.

Clause 4: The fluid transfer device (1) according to clause 2, wherein the first body part (50) is movable relative to the second body part (60) along a first direction (2) to transfer the fluid transfer device (1) from the first configuration into the second configuration and wherein the first body part (50) is further movable relative to the second body part (60) along the first direction (2) to transfer the fluid transfer device (1) from the second configuration into the first configuration.

Clause 5: The fluid transfer device (1) according to any one of the preceding clauses 2-4, wherein the first body part (50) defines a longitudinal axis (A) and wherein the second body part (60) is rotatable relative to the first body part (50) with the longitudinal axis (A) as an axis of rotation.

Clause 6: The fluid transfer device (1) according to any one of the preceding clauses 2-5, wherein the first body part (50) comprises the first fluid channel (10) and wherein the second body part (60) comprises at least one of the second fluid channel (20) and the third fluid channel (30).

Clause 7: The fluid transfer device (1) according to any one of the preceding clauses 2-6, wherein the second body part (60) comprises the second fluid channel (20) and the third fluid channel (30).

Clause 8: The fluid transfer device (1) according to any one of the preceding clauses, wherein the body (5) further comprises a first transfer channel (80), wherein the first transfer channel (80) comprises:

a first passageway (85) comprising a proximal end (81) merging into the first fluid channel (10) and a distal end (83) connectable to the third fluid channel (30), and a first branch section (82) merging into the first passageway (85) and connectable to the second fluid channel (20).

Clause 9: The fluid transfer device (1) according to clause 8 and according to any one of the preceding clauses 2-7, wherein the first body part (50) comprises the first transfer channel (80).

Clause 10: The fluid transfer device (1) according to clause 9, wherein when the fluid transfer device (1) is in the first configuration, the distal end (83) of the first passageway (85) is in flow connection with the third fluid channel (30) and the first branch section (82) is in flow connection with the second fluid channel (20).

Clause 11: The fluid transfer device (1) according to clause 8-10, wherein when the fluid transfer device (1) is in the second configuration, the distal end (83) of the first passageway (85) is disconnected from the third fluid channel (30) and the first branch section (82) is disconnected from the second fluid channel.

Clause 12: The fluid transfer device (1) according to any one of the preceding clauses 8-11, wherein the first passageway (85) comprises a first check valve (84) located between the distal end (83) of the first passageway (85) and the first branch section (82), the first check valve (84) is configured to support a flow of fluid from the proximal end (81) towards the distal end (83) of the first passageway (85) and to block a flow of fluid from the distal end (83) towards the proximal end (81) of the first passageway (85).

Clause 13: The fluid transfer device (1) according to any one of the preceding clauses 8-12, wherein the first branch section (82) comprises a second check valve (86) configured to support a flow of fluid from the first passageway (85) into the first branch section (82) and to block a flow of fluid from the first branch section (82) into the first passageway (85).

Clause 14: The fluid transfer device (1) according to any one of the preceding clauses, wherein the body (5) further comprises a second transfer channel (90), wherein the second transfer channel (90) comprises:

a second passageway (95) comprising a proximal end (91) merging into the first fluid channel (10) and a distal end (93) connectable to the third fluid channel (30), and a second branch section (92) merging into the second passageway (95) and connectable to the second fluid channel (20).

Clause 15: The fluid transfer device (1) according to clause 14 and according to any one of the preceding clauses 2-7, wherein the first body part (50) comprises the second transfer channel (90).

Clause 16: The fluid transfer device (1) according to clause 15, wherein when the fluid transfer device (1) is in the second configuration, the proximal end (91) of the second passageway (95) is in flow connection with the third fluid channel (30) and the second branch section (92) is in flow connection with the second fluid channel (20).

Clause 17: The fluid transfer device (1) according to clause 14-16, wherein when the fluid transfer device (1) is in the first configuration, the distal end (93) of the second passageway (95) is disconnected from the third fluid channel (30) and the second branch section (92) is disconnected from the second fluid channel (20).

Clause 18: The fluid transfer device (1) according to any one of the preceding clauses 14-17, wherein the second passageway (95) comprises a third check valve (94) located between the distal end (93) of the second passageway (95)

and the second branch section (92), the third check valve (94) is configured to support a flow of fluid from the proximal end (91) towards the distal end (93) of the second passageway (95) and to block a flow of fluid from the distal end (93) towards the proximal end (91) of the second passageway (95).

Clause 19: The fluid transfer device (1) according to any one of the preceding clauses 14-18, wherein the second branch section (92) comprises a fourth check valve (96) configured to support a flow of fluid from the second passageway (95) into the second branch section (92) and to block a flow of fluid from the second branch section (92) into the second passageway (95).

Clause 20: The fluid transfer device (1) according to any one of the preceding clauses, wherein the first connecting portion (11) comprises a diluent container spike (12) configured to penetrate a pierceable seal (104) of the diluent container (100) and wherein the first fluid channel (10) extends into or through the diluent container spike (12).

Clause 21: The fluid transfer device (1) according to any one of the preceding clauses, wherein the second connecting portion (21) comprises a medicament container spike (24) configured to penetrate a pierceable seal (204) of the medicament container (200).

Clause 22: The fluid transfer device (1) according to clause 21, wherein the second connecting portion (21) comprises a receptacle (25) to receive a barrel head (208) of a barrel (201) of the medicament container (200).

Clause 23: transfer device (1) according to clause 22, wherein the receptacle (25) comprises a sidewall (26), wherein the sidewall comprises numerous sidewall segments (27) comprising a snap feature (28) to engage with the barrel head (208).

Clause 24: The fluid transfer device (1) according to any one of the preceding clauses, wherein the body (5) comprises a third connecting portion (31) fluidically coupled to the third fluid channel (30), the third connecting portion (31) comprises a mechanical connector (33) configured to connect with a mechanical counter connector of the pump device (300) in a fluid transferring manner.

Clause 25: An kit (70) comprising:
- a fluid transfer device (1) according to any one of the preceding clauses,
- a diluent container (100) connectable or connected to the first connecting portion (11) of the fluid transfer device (1),
- a medicament container (200) connectable or connected to the second connecting portion (21) of the fluid transfer device (1),
- a pump device (300) connectable or connected to the third fluid channel (30) of the fluid transfer device (1).

Clause 26: The kit (70) according to clause 25, wherein when the fluid transfer device (1) is in the first configuration, the pump device (300) is configured
- to withdraw a first amount of a fluid located in the diluent container (100) through the first fluid channel (10) into the third fluid channel (30) towards or into the pump device (300) and
- to expel at least a portion of the first amount of the fluid through the third fluid channel (30) into the second fluid channel (20) and into the medicament container (200).

Clause 27: The kit (70) according to clause 25 or 26, wherein when the fluid transfer device (1) is in the second configuration, the pump device (300) is configured
- to withdraw a first amount of a fluid located in the medicament container (200) through the second fluid channel (20) into the third fluid channel (30) towards or into the pump device (300) and
- to expel at least a portion of the first amount of the fluid through the third fluid channel (30) into the first fluid channel (10) and into the diluent container (100).

Clause 28: A method of transferring of a fluid between a diluent container (100) and a medicament container (200) by using a fluid transfer device (1) according to any one of the preceding clauses 1-23, the method comprising the steps of:
- using the fluid transfer device (1) according to any one of the preceding clauses in the first configuration,
- connecting the first connecting portion (11) of the fluid transfer device (1) to the diluent container (100),
- connecting the second connecting portion (21) of the fluid transfer device (1) to the medicament container (200),
- applying a negative pressure to the third fluid channel (30) and transferring a first amount of a fluid located in the diluent container (100) through the first fluid channel (10) into the third fluid channel (30) towards or into the pump device (300), and
- expelling at least a portion of the first amount of the fluid through the third fluid channel (30) into the second fluid channel (20) and into the medicament container (200).

Clause 29: A method of transferring of a fluid between a diluent container (100) and a medicament container (200) by using a fluid transfer device (1) according to any one of the preceding clauses 1-24, the method comprising the steps of:
- using the fluid transfer device (1) according to any one of the preceding clauses in the second configuration,
- connecting the first connecting portion (11) of the fluid transfer device (1) to the diluent container (100) or to an infusion container (100'),
- connecting the second connecting portion (21) of the fluid transfer device (1) to the medicament container (200),
- applying a negative pressure to the third fluid channel (30) and transferring a first amount of a fluid located in the medicament container (200) through the second fluid channel (20) into the third fluid channel (30) towards or into the pump device (300), and
- expelling at least a portion of the first amount of the fluid through the third fluid channel (30) into the first fluid channel (10) and into the diluent container (100) or infusion container (100').

Clause 30: A method of administering an injectable medicament, the method comprising the steps of preparing the injectable medicament by using a fluid transfer device, wherein the fluid transfer device comprises:
- a body (5),
- a first connecting portion (11) to connect to the diluent container (100), the first connecting portion (11) comprising a first fluid channel (10) to fluidically communicate with an interior (102) of the diluent container (100),
- a second connecting portion (21) to connect to the medicament container (200), the second connecting portion comprising a second fluid channel (20) to fluidically communicate with an interior (202) of the medicament container (200),
- a third fluid channel (30) to fluidically communicate with a pump device (300), wherein in a first configuration of the fluid transfer device (1):
- the first fluid channel (10) is fluidically coupled to the third fluid channel (30) to support a flow of fluid from the first fluid channel (10) into the third fluid channel (30), and the third fluid channel (30) is fluidically coupled to the second fluid channel (20) to support a flow of fluid from the third fluid channel (30) into the second fluid channel (20), and to prevent a flow of fluid from the third fluid channel (30) into the first fluid channel (10), and wherein in a second configuration of the fluid transfer device (1), the second fluid channel (20) is fluidically coupled to the third fluid channel (30) to support a flow of fluid from the second fluid channel (20) into the third fluid channel (30), and the third fluid channel (30) is fluidically coupled to the first fluid channel (10) to support a flow of fluid from the third fluid channel (30) into the first fluid channel (10) and to prevent a flow of fluid from the third fluid channel (30) into the second fluid channel (20).

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders.

Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N—(ω-carboxyheptadecanoyl)-des(B30) human insulin and B29-N—(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrom.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, small modular immunopharmaceuticals (SMIP), binding-domain immunoglobulin fusion proteins, camelized antibodies, and immunoglobulin single variable domains. Additional examples of antigen-binding antibody fragments are known in the art.

The term "immunoglobulin single variable domain" (ISV), interchangeably used with "single variable domain", defines immunoglobulin molecules wherein the antigen binding site is present on, and formed by, a single immunoglobulin domain. As such, immunoglobulin single variable domains are capable of specifically binding to an epitope of the antigen without pairing with an additional immunoglobulin variable domain. The binding site of an immunoglobulin single variable domain is formed by a single heavy chain variable domain (VH domain or VHH domain) or a single light chain variable domain (VL domain). Hence, the antigen binding site of an immunoglobulin single variable domain is formed by no more than three CDRs.

An immunoglobulin single variable domain (ISV) can be a heavy chain ISV, such as a VH (derived from a conventional four-chain antibody), or VHH (derived from a heavy-chain antibody), including a camelized VH or humanized VHH. For example, the immunoglobulin single variable domain may be a (single) domain antibody, a "dAb" or dAb or a Nanobody® ISV (such as a VHH, including a humanized VHH or camelized VH) or a suitable fragment thereof. [Note: Nanobody® is a registered trademark of Ablynx N.V.]; other single variable domains, or any suitable fragment of any one thereof.

"VHH domains", also known as VHHs, VHH antibody fragments, and VHH antibodies, have originally been described as the antigen binding immunoglobulin variable domain of "heavy chain antibodies" (i.e., of "antibodies devoid of light chains"; Hamers-Casterman et al. 1993 (Nature 363: 446-448). The term "VHH domain" has been chosen in order to distinguish these variable domains from the heavy chain variable domains that are present in conventional 4-chain antibodies (which are referred to herein as "VH domains") and from the light chain variable domains that are present in conventional 4-chain antibodies (which are referred to herein as "VL domains"). For a further description of VHH's, reference is made to the review article by Muyldermans 2001 (Reviews in Molecular Biotechnology 74: 277-302).

For the term "dAb's" and "domain antibody", reference is for example made to Ward et al. 1989 (Nature 341: 544), to Holt et al. 2003 (Trends Biotechnol. 21: 484); as well as to WO 2004/068820, WO 2006/030220, WO 2006/003388. It should also be noted that, although less preferred in the context of the present invention because they are not of mammalian origin, single variable domains can be derived from certain species of shark (for example, the so-called "IgNAR domains", see for example WO 2005/18629).

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

BRIEF DESCRIPTION OF THE FIGURES

In the following, an example of the fluid transfer device and a kit comprising such a foot transfer device to provide a fluid transfer between a diluent container, a medicament container and a pump device will become apparent in greater detail by making reference to the drawings, in which.

DETAILED DESCRIPTION

Figure 8:
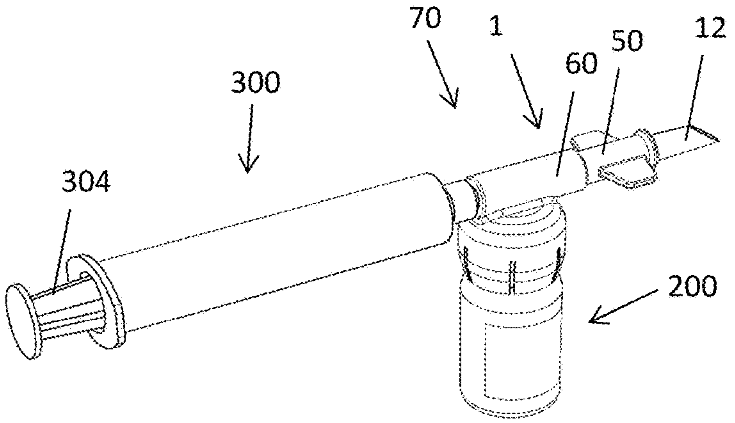
FIG. 8 shows the assembly of FIG. 7 with a protective cap detached from the diluent container spike of the fluid transfer device.
Figure 9:
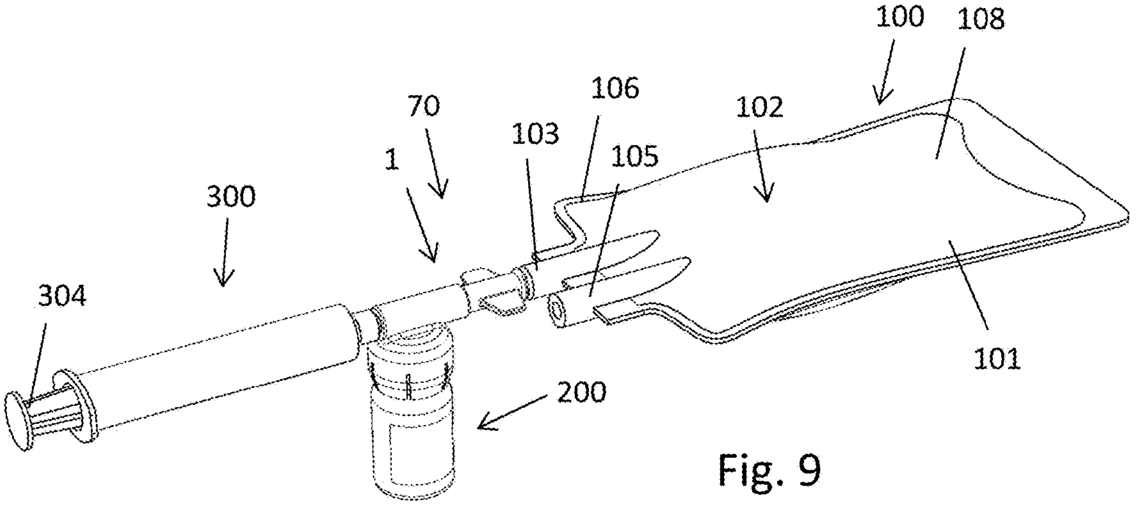
FIG. 9 shows an infusion kit comprising the fluid transfer device, the medicament container, a diluent container and a pump device.

FIGS. 1-14 illustrate an example of a fluid transfer device 1, which may form part of an infusion kit 70 as illustrated in FIG. 9. The fluid transfer device 1 as shown in detail in FIGS. 1-4 comprises a body 5 with a first connecting portion 11 to connect to a diluent container 100. The first connecting portion 11 comprises a first fluid channel 10 to fluidically communicate with an interior 102 of the diluent container 100. The fluid transfer device 1 further comprises a second connecting portion 21 to connect to a medicament container 200. The second connecting portion 21 comprises a second fluid channel 20 to fluidically communicate with an interior 202 of the medicament container 200.

In the presently illustrated example of the fluid transfer device 1 there is further provided a third connecting portion 31, which is configured for connecting to a pump device 300. The pump device 300 may comprise a syringe 301 with a syringe barrel 302 and a plunger 304 longitudinally displaceable inside the syringe barrel 302.

The third connecting portion 31 comprises a third fluid channel 30. The third connecting portion 31 may be only optionally implemented. In some examples (not illustrated) the pump device 300 may be integrally formed with a body 5 of the fluid transfer device 1.

Figure 1:
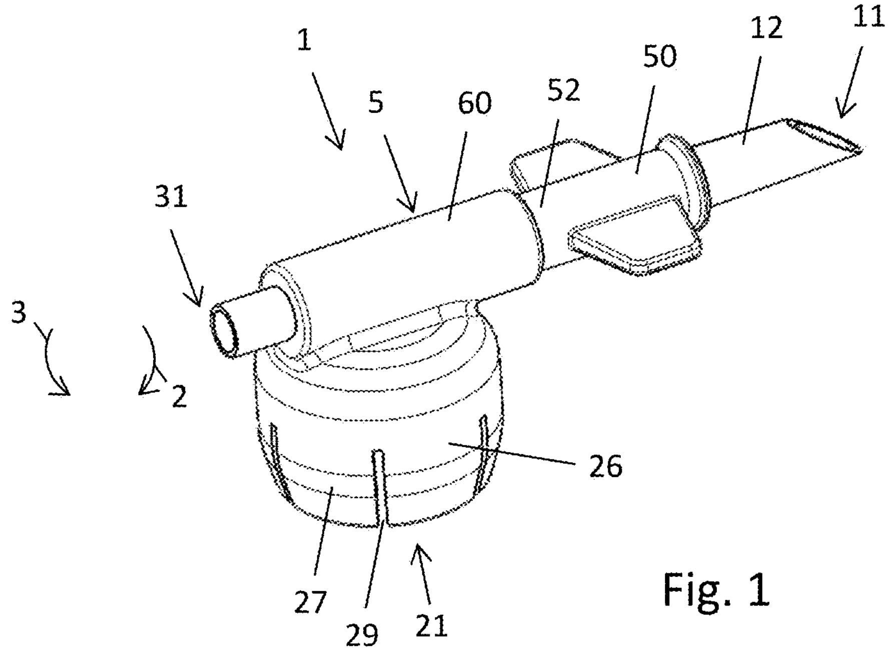
FIG. 1 schematically shows one example of a fluid transfer device in the first configuration.
Figure 2:
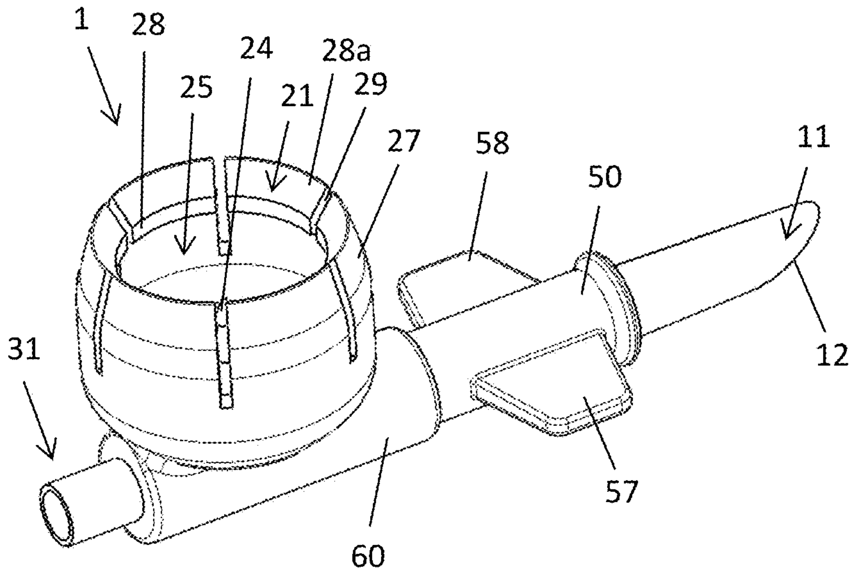
FIG. 2 shows the fluid transfer device in the second configuration.
Figure 3:
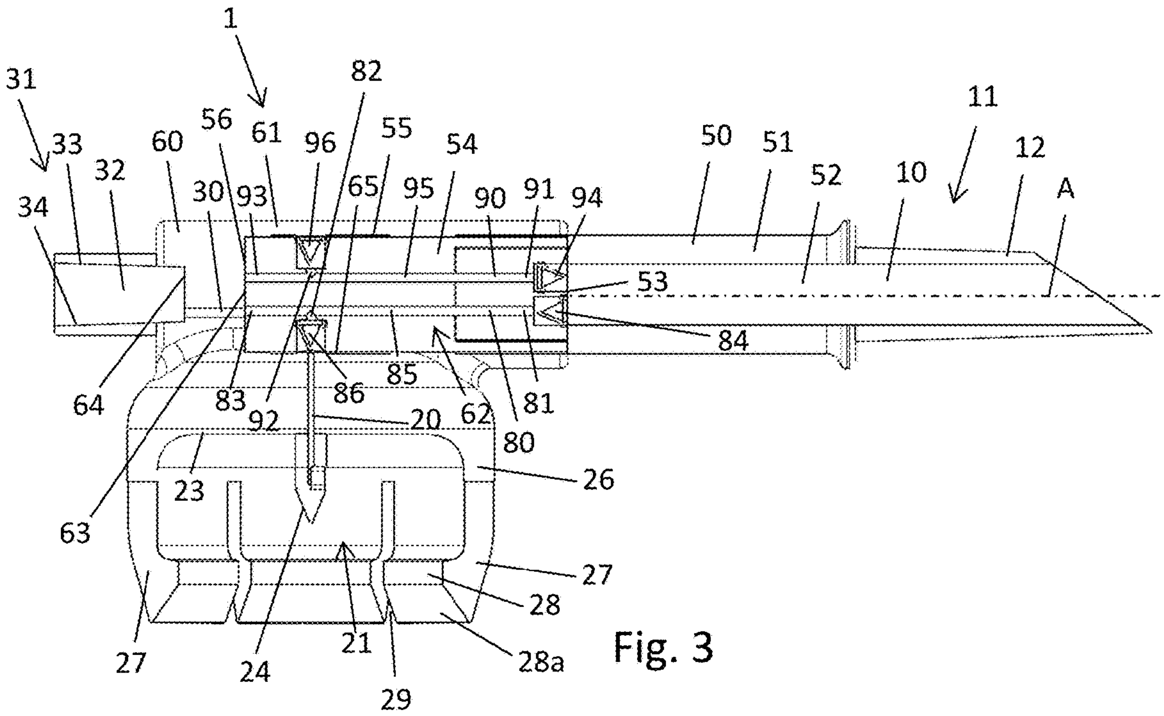
FIG. 3 is a longitudinal cross-section through the fluid transfer device in the first configuration.
Figure 4:
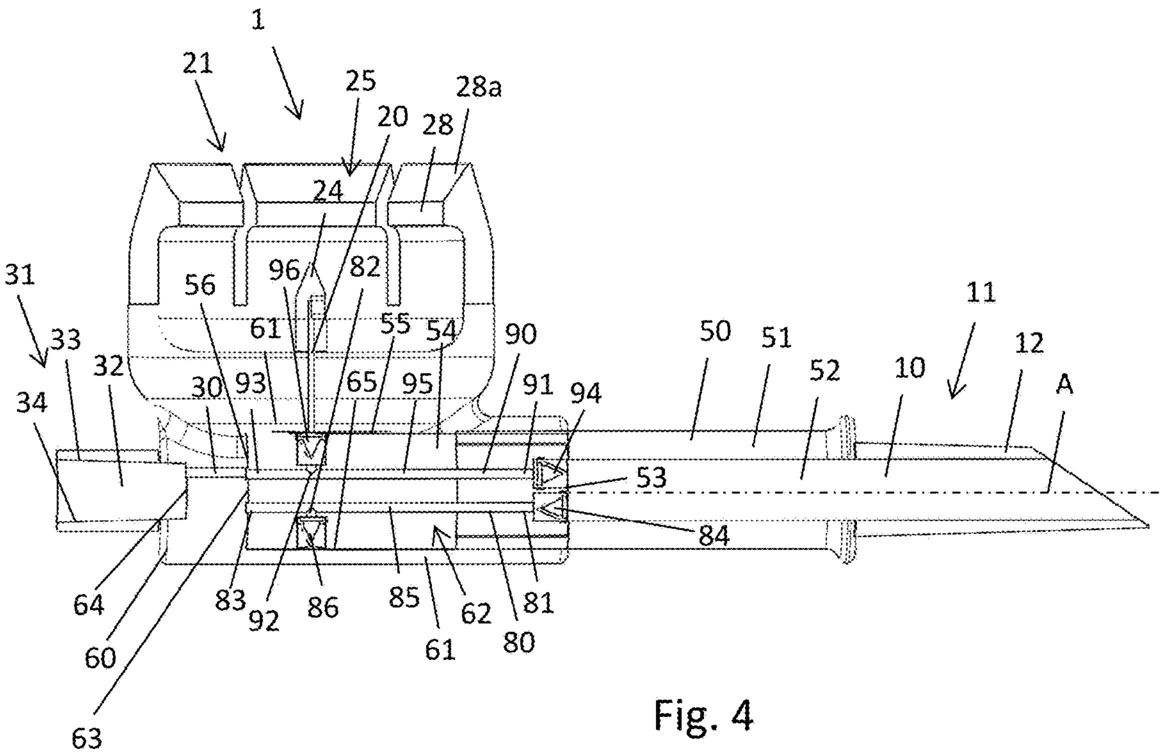
FIG. 4 is a longitudinal cross-section through the fluid transfer device in the second configuration.

In the presently illustrated example the body 5 of the fluid transfer device 1 comprises a first body part 50 and a second body part 60. The first body part 50 is movable relative to the second body part 60. In this way the fluid transfer device 1 can be switched between a first configuration as illustrated in FIGS. 1 and 3, and a second configuration as illustrated in FIGS. 2 and 4. In the two alternative configurations there is realized an alternating fluid connection between the first fluid channel 10, the second fluid channel 20 and the third fluid channel 30.

As will be explained below in greater detail and when the fluid transfer device 1 is in the first configuration the first fluid channel 10 is fluidically coupled to the third fluid channel 30 to support a flow of fluid from the first fluid channel 10 into the third fluid channel 30 and optionally further into the pump device 300, which may be fluidically connected or fluidically coupled to the third fluid channel 30. In the first configuration the third fluid channel 30 is further fluidically coupled to the second fluid channel 20 to support a flow of fluid from the pump device 300 into the third fluid channel 30 and further into the second fluid channel 20. Here and when the fluid transfer device 1 is in the first configuration a flow of fluid from the third fluid channel 30 back into the first fluid channel 10 is effectively prevented or blocked.

In this way and when the fluid transfer device 1 is in the first configuration there can be applied a negative pressure to the third fluid channel 30, which causes withdrawal of a well-defined amount of a diluent or of a fluid from the interior 102 of the diluent container 100 into the first fluid channel 10 and further into the third fluid channel 30 and further into the pump device 300. Thereafter, the operation of the pump device 300 may be inverted. Then, a positive pressure may be applied to the third fluid channel 30 and a portion of the amount of fluid previously transferred into the pump device 300 can now be expelled in opposite direction into the third fluid channel 30. However, in the first configuration of the fluid transfer device 1 a fluid flow supported or supplied into the distal end of the third fluid channel 30 is redirected into the second fluid channel 20 and hence into the medicament container 200, which is fluidically coupled to the second fluid channel 20.

In this way a well-defined amount of a diluent or of a fluid can be withdrawn from the diluent container 100 and can be supplied to or can be expelled into the medicament container 200.

In some examples and depending on the total amount of diluent required to be supplied into the medicament container 200 the above-mentioned procedure of alternately applying a negative and a positive pressure to the third fluid channel 30 can be repeated. When having transferred a well-defined or predefined amount of a fluid, e.g., of a diluent from the diluent container 100 into the medicament container 200 there may be conducted a diluting or reconstitution process with the medicament and the diluent both contained inside the medicament container 200.

Before, during or after conducting of a diluting or reconstitution procedure the fluid transfer device 1 may be switched or transferred into a second configuration, e.g. as illustrated in FIGS. 2 and 4. Then and when in the second configuration the second fluid channel is fluidically coupled to the third fluid channel to support a flow of fluid from the second fluid channel 20 into the third fluid channel 30. Moreover, the third fluid channel 30 is fluidically coupled to the first fluid channel 10 to support a flow of fluid from the third fluid channel 30 into the first fluid channel 10 and to prevent a flow of fluid or to block a flow of fluid from the third fluid channel 30 back into the second fluid channel 20.

Figure 10:
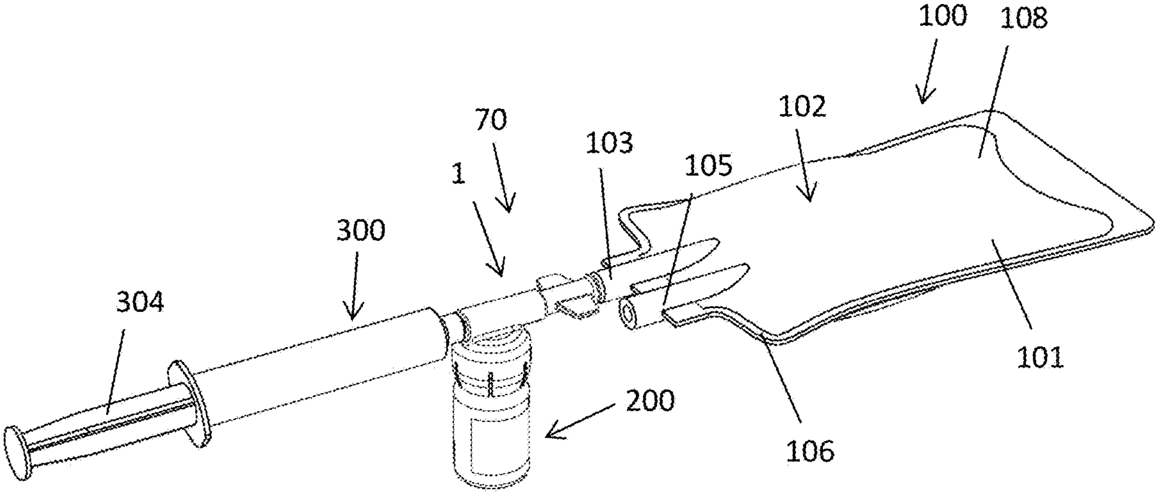
FIG. 10 shows the infusion kit according to FIG. 9 with the pump device applying a negative pressure to the fluid transfer device.

Here, a flow of fluid from the second fluid channel 20 into the third fluid channel 30 may be governed or provided by applying a negative pressure to the third fluid channel 30, e.g. by withdrawing the plunger 304 of the syringe 301 in a distal direction as e.g. illustrated by a comparison of the configurations of FIGS. 9 and 10. In the second configuration as shown in FIGS. 2 and 4, the orientation of the second connecting portion 21 may be inverted or maybe upside down compared to an orientation of the second connecting portion 21 when the fluid transfer device 1 is in the first configuration. In this way, a liquid fraction contained inside the medicament container 200 can get or stay in fluid communication with the second fluid channel 20 such that when a negative pressure is applied to the second fluid channel, e.g. via a fluidic coupling with the third fluid channel 30, a well-defined or predefined amount of the fluid located inside the medicament container 200 can be withdrawn into the second fluid channel 20 and further into the third fluid channel 30 towards and into the pump device 300.

By inverting the pump direction of the pump device 300, e.g. by pushing the plunger 304 into the syringe barrel 302 the previously withdrawn amount of the fluid can now be expelled into the third fluid channel 30 and further into the first fluid channel 10, which may be still in fluid communication with the interior 102 of the diluent container 100.

In the illustrated example the fluid transfer device 1 comprises a body 5, which comprises a first body part 50 and a second body part 60. The first body part 50 comprises an elongated structure extending in a longitudinal direction A. The first body part 50 comprises a somewhat tubular shaped sidewall 51 enclosing the tubular shaped first fluid channel 10. A proximal end of the sidewall 51 of the body part 50 comprises or forms the connecting portion 11. The connecting portion 11 comprises a diluent container spike 12, which comprises a tapered proximal tipped end for piercing a pierceable seal 104 of a port structure 103 of the diluent container 100.

As particularly illustrated in FIG. 9 the diluent container 100 comprises a flexible bag 101 with two separate port structures 103, 105. The flexible bag 101 may comprise one or several layers of a pliable sheet 108, which may be welded or seamed along a circumferential seam 106. The port structures 103, 105 may comprise a pierceable seal 104, which may be penetrable by a diluent container spike 12. In further examples (not illustrated) at least one of the port structures 103, 105 may comprise a standardized connector, such as a Luer-type connector for establishing a fluid transferring connection between the first fluid channel 10 as provided by or in the first connecting portion 11 and the interior 102 of the diluent container 100.

As further illustrated in FIGS. 1-4 the first body part 50 comprises an elongated bore 52 that is coaxial with the first fluid channel 10. The elongated bore 52 is open towards the proximal end and hence towards the free end of the diluent container spike 12. As particularly illustrated in FIG. 5 and in an initial configuration the diluent container spike 12 may be covered by a protective cap 14, which has to be detached or disconnected from the diluent container spike 12 before engaging with the port structure 103 of the diluent container 100.

The first body part 50 may comprise an elongated shaft, which may be of substantial tubular shaped. The bore 52 may be delimited in longitudinal direction by an end face 53. Insofar the bore 52 is open towards the free end of the diluent container spike 12 and may comprise a bottom that terminates by the end face 53 inside the first body part 50. The first body part 50 may comprise an insert portion 54, which may be located or mounted inside a cup-shaped receptacle 62 of the second body part 60. The second body part 60 may comprise a sidewall 61 and a cup-shaped receptacle 62, which is open towards the proximal end so as to receive the first body part 50.

A distal portion of the first body part 50 is located inside the receptacle 62 of the second body part 60. The sidewall 61 of the body part 60 confining the receptacle 62 is sized to receive the outside surface 55 of the insert portion 54 of the first body part 50, which insert portion 54 is provided at or formed by the distal end of the first body part 50. The receptacle 62 of the second body part 60 may be terminated or delimited by an end face 63. The end face 63 may form a bottom of the elongated receptacle 62 of the second body part 60, that receives or accommodates the distal insert portion 54 of the first body part 50.

Typically, an inside surface 65 of the sidewall 61 of the receptacle 62 is complementary shaped to an outside surface 55 of the insert portion 54 of the first body part 50. The inside surface 65 and the outside surface 55 may be in a sliding engagement. The inside surface 55 and/or the outside surface 55 may be implemented as gliding or sliding surfaces. In this way, the first body part 50 may be rotated relative to the second body part 60 with regard to the longitudinal axis A as an axis of rotation.

Figure 11:
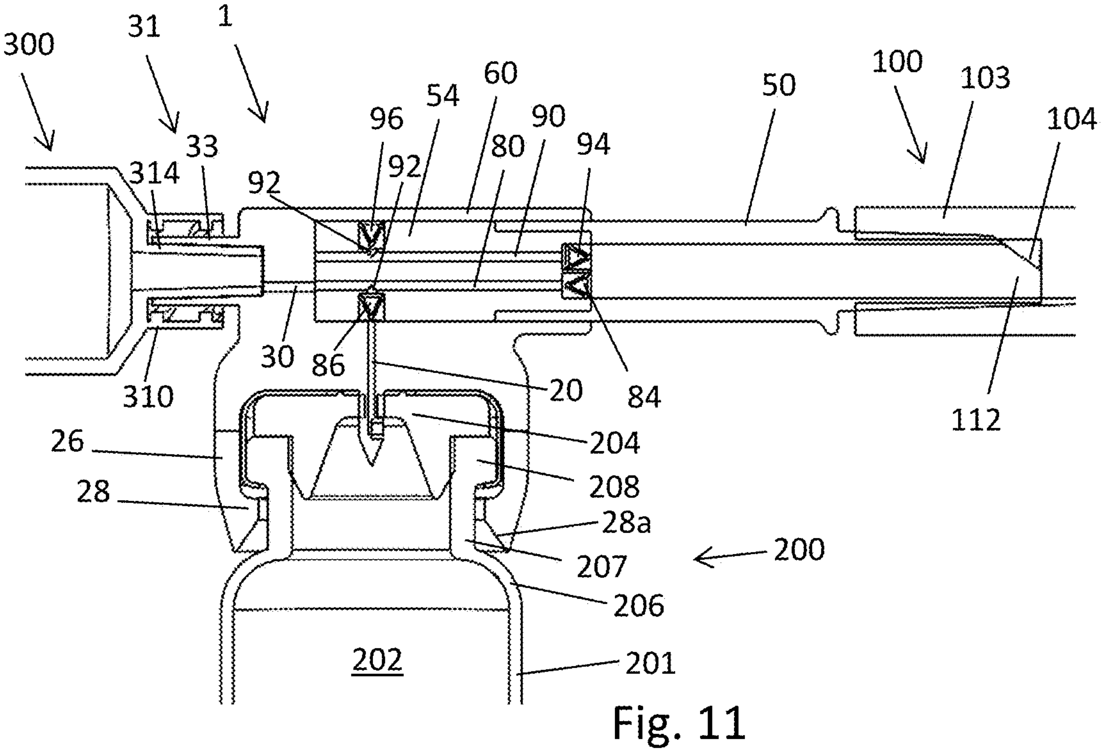
FIG. 11 shows a longitudinal cross-section through the infusion kit in the first configuration of the fluid transfer device.

The second body part 60 comprises the third fluid channel 30. The third fluid channel 30 comprises a proximal end merging into the end face 63 of the receptacle 62. The third fluid channel 30 further comprises a distal end that merges into a receptacle 32, which receptacle 32 is configured to engage with a tapered section 314 of the pump device 300 as illustrated in FIG. 11. The receptacle 32 may be part of a third connecting portion 31 of the fluid transfer device 1. The receptacles 32 may comprise a tapered sidewall 34 to receive a complementary shaped tapered section 314 at an outlet end of the syringe barrel 302.

In some examples the connecting portion 31 comprises a standardized mechanical connector 33 to engage with a complementary shaped counter connector 310 as provided at a respective outlet end of the pump device, e.g. at an outlet of the syringe barrel 302. Accordingly, a sidewall of the receptacles 32 of the third connecting portion 31 may be provided with a tapered section 34. In this way and when the mechanical connector 33 of the third connecting portion 31 is duly connected with a complementary shaped counter connector 310 of the pump device 300 there can be applied a negative pressure to the third fluid channel 30, e.g. by withdrawing the plunger 304 outwardly, hence out of the syringe barrel 302. There can be also provided a positive pressure or there can be expelled a fluid into the third fluid channel 30 by pushing the plunger 304 into the syringe barrel 302.

In the example as shown in FIG. 3, the third fluid channel 30 is part of the second body part 60. The third connecting portion 31 and the mechanical connector 33 are part of the first body part 50. The second body part 60 may comprise or may form a bottom or an end face 64 of the receptacle 32 of the third connecting portion 31. By rotating the second body part 60 relative to the first body part and by switching the fluid transfer device 1 between the first configuration and the second configuration the position of the third fluid channel 30 in the receptacle 32 is subject to respective modifications as will be apparent from a comparison of FIGS. 3 and 4. In both configurations as shown in FIGS. 3 and 4 the distal end of the third fluid channel 30 is always in fluid communication with the receptacle 32 and hence with the third connecting portion 31. Accordingly, and in a further example (not illustrated) the third connecting portion 31 and hence the mechanical connector 33 for fastening the pump device 300 to the fluid transfer device 1 may be also implemented or provided by the second body part 60.

As further illustrated in FIGS. 1-4, the second body part 60 further comprises the second connecting portion 21 to attach and/or to connect the medicament container 200 to the second fluid channel 20. The second fluid channel 20 extends in radial direction as seen with regard to the longitudinal axis A. It may terminate radially inwardly in the inside surface 65 of the receptacle 62. It may further extend through or into a receptacle 25 and in particular through a bottom 23 of a receptacle 25, which is implemented to receive a barrel head 208 of the medicament container 200. The receptacle 25 comprises a bottom 23, which may be integrally formed with the sidewall 61 of the second body part 60. The bottom 23 may comprise a surface normal that faces in a radial direction as seen with regards to the longitudinal direction A.

The receptacle 25 may be implemented as a cup-shaped receptacle. The receptacle 25 comprises a somewhat tubular sidewall 26 with numerous sidewall segments 27. The sidewall segments 27 may be elastically deformable radially outwardly with respect to the cylindrical geometry or tubular-shaped geometry of the receptacle 25. The sidewall 26 comprises numerous elongated sidewall segments 27, that are separated in circumferential direction by longitudinal slits 29. Each or some of the sidewall segments 27 comprise a snap feature 28 to engage in a snap-fitting manner with the barrel head 208 of the medicament container 200. The snap features 28 may be provided with a beveled section **28*a* that engages with the outer rim of the barrel head 208 as the barrel head 208 is pushed coaxially into the receptacle 25**.

The second connecting portion 21, which comprises the receptacle 25 may be further provided with a medicament container spike 24, which protrudes longitudinally from the bottom 23 into the receptacle 25.

As particularly illustrated in FIG. 11 and when the medicament container 200 is correctly attached to the second connecting portion 21 a radially narrowing shoulder portion 206 of the tubular shaped barrel 201 of the medicament container 200 is located outside the receptacle 25. A radially narrowed neck portion 207 of the barrel 201 may longitudinally align with the snap features 28 of the sidewall segments 27, while the snap features 28 grip under the radially widened barrel head 208 of the barrel 201 of the medicament container 200. When reaching this well-defined fastening configuration, the medicament container spike 24 has penetrated a pierceable seal 204, e.g. in form of a stopper provided at an outlet end of the medicament container 200. The second fluid channel 20 extends into or through the medicament container spike 24 and gets in fluid communication with the interior 202 of the medicament container 200.

As further illustrated in greater detail in FIGS. 1-4 the first body part 50 comprises a first transfer channel 80 and a second transfer channel 90. The first transfer channel 80 and the second transfer channel 90 may extend parallel to each other and may be located longitudinally between a distal end of the first fluid channel 10 and a proximal end of the third fluid channel 30. The transfer channels 80, 90 both comprise a respective first and second passageway 85, 95. A proximal end 81 of the first passageway 85 adjoins or merges into the first fluid channel 10. Likewise, a proximal end 91 of the second passageway 95 of the second transfer channel 90 also merges or adjoins into the first fluid channel 10. An opposite end of the first and second passageways 85, 95, hence a distal end 83 of the first passageway 85 is in fluid communication with the third fluid channel 30 when the fluid transfer device 1 is in the first configuration. Here and when in the first configuration the distal end 93 of the second passageway 95 of the second transfer channel 90 is disconnected from the third fluid channel 30.

The first transfer channel 80 further comprises a first branch section 82 extending radially outwardly under a predefined angle relative to the elongation of the first passageway 85. The branch section 82 may extend radially outwardly through the insert portion 54 and may terminate or may merge with the outside surface 55 of the insert portion 54. Likewise, the second transfer channel 90 may comprise a second branch section 92, which extends radially outwardly from the second passageway 95. The second branch section 92 may likewise terminate in or may merge into the outside surface 55. The outside ends of the first and second branch sections 82, 92 may terminate at opposite or at circumferentially offset positions on the outside surface 55 of the insert portion 54 of the first body part 50.

Here, and in the first configuration as shown in FIG. 3 the first branch section 82 aligns with and is fluidically coupled to the second fluid channel 20. In the second configuration the second branch section 92 of the second transfer channel 90 is aligned and is fluidically connected to the second fluid channel 20 as shown in FIG. 4. In the first configuration the second branch section 92 is disconnected from the second fluid channel 20. In the second configuration the first branch section 82 is disconnected from the second fluid channel 20.

One end of the second fluid channel 20 terminates in the medicament container spike. The medicament container spike may comprise an orifice that forms or constitutes one longitudinal end of the second fluid channel 20. An opposite longitudinal end of the second fluid channel 20 terminates at the inside surface 65 of the sidewall 61 of the second body part 60 that confines the receptacle 62, which is sized and configured to receive the insert portion 54 of the first body part 50.

Moreover in the second configuration as shown in FIG. 4 the third fluid channel 30 is aligned and is in fluid communication with the distal end 93 of the second passageway 95. Here, the first passageway 85 is disconnected from the third fluid channel 30.

In order to provide a desired fluid communication between the first fluid channel 10, the second fluid channel 20 and the third fluid channel 30 in the first configuration and in the second configuration there is further provided a number of check valve 84, 86, 94, 96 in the first and in the second transfer channels 80, 90.

In particular, the first passageway 85 is provided with a first check valve 84 and the first branch section 82 is provided with a second check valve 86. The first check valve 84 supports a flow of a fluid from the first fluid channel 10 through the first passageway 85 towards the third fluid channel 30 but prevents a flow of a fluid in an opposite direction. The first check valve 84 is located between the proximal end 81 and the first branch section 82. In this way, there can be provided a counter directed flow of fluid towards the first branch section 82 via the distal end 83 of the first passageway 85.

The second check valve 86 is configured to support a flow of fluid from the first passageway 85 into the second fluid channel 20 but is operable to prevent an oppositely directed flow. The second check valve 86 may be operable to prevent a flow of a fluid from the second fluid channel 20 back into the first branch section 82.

The first and/or second check valves 84, 86 are of particular use during a first stage of using the fluid transfer device, namely when the fluid transfer device 1 is in the first configuration. By applying a negative pressure to the third fluid channel 30 and due to the fluid connection between the third fluid channel and the first passageway 85 a respective suction effect can be transferred via the first check valve 84 into the first fluid channel 10. The second check valve 86 prevents a respective suction effect and effectively separates or decouples the second fluid channel 20 from the first branch section 82 and hence from the passageway 85.

Accordingly, application of a negative pressure to the third fluid channel 30 leads to the withdrawing of a respective amount of a fluid from the interior 102 of the diluent container 100 through the first fluid channel 10 into the first passageway 85 and further into the third fluid channel 30 and then even further into the syringe barrel 302 of the pump device 300. Now and in a subsequent step the plunger 304 of the syringe 301 may be depressed inwardly so as to expel an amount of the fluid back into the third fluid channel 30. Since the first check valve 84 effectively closes a return path into the first fluid channel 10 and since the second check valve 86 is configured to support a respective flow of fluid, the fluid as expelled into the third fluid channel 30 in opposite direction is transferred into the first branch section 82, which is aligned with the second fluid channel 20. Accordingly, an amount of a fluid expelled from the pump device 300 is expelled into the third fluid channel 30 and further into the second fluid channel 20, which leads to a respective transfer of the fluid into the medicament container 200.

The pump device 300 may be operated multiple times in a suction and in an expelling mode in order to transfer a well-defined amount of a fluid from the diluent container 100 into the medicament container 200. In order to withdraw or to transfer a fluid from the medicament container 200 back into the diluent container 100 or into some other container replacing the diluent container 100 the fluid transfer device 1 is switched from the first configuration as shown in FIGS. 1 and 3 into the second configuration as shown in FIGS. 2 and 4. Here, the second body part 60 may be rotated by 180° relative to the first body part 50, e.g. along a first direction 2 or along a second direction 3.

In this way, the second fluid channel 20 now aligns with the second branch section 92 of the second transfer channel 90. The second branch section 92 is provided with a fourth check valve 96, which is configured to oppositely compared to the second check valve 86. Hence, the fourth check valve 96 supports a flow of a fluid from the second fluid channel 20 towards and into the branch section 92 and further into the second passageway 95. The second transfer channel 90 is further provided with a third check valve 94, which is also oppositely configured compared to the first check valve 84. The third check valve 94 is located between the proximal end 91 of the second passageway and the second branch section 92. The third check valve 94 is operable to prevent a flow of fluid in distal direction and hence to prevent a flow of fluid from the first fluid channel 10 into the second passageway 95 or into the second branch section 92.

In the second configuration as shown in FIG. 4 the third fluid channel 30 is further aligned with the distal end 93 of the second passageway 95. In this way and when applying a negative pressure to the third fluid channel 30 a well-defined amount of a liquid or fluid can be withdrawn through the second fluid channel into the second passageway 95 and further towards the distal end 93 of the second passageway 95 further into the third fluid channel 30 and then even further into the pump device 300.

When inverting the pump direction subsequently and when expelling the fluid into the third fluid channel 30 in proximal direction a respective flow of fluid will enter the distal end 93 of the second passageway 95. A flow of fluid into the second branch section 92 is effectively blocked by the fourth check valve 96. Rather, the flow of fluid is then transferred towards the proximal end 91 of the second passageway 95 and may then transition into the first fluid channel 10 and further into the interior 102 of the diluent container 100 as supported by the first check valve 84.

Figure 7:
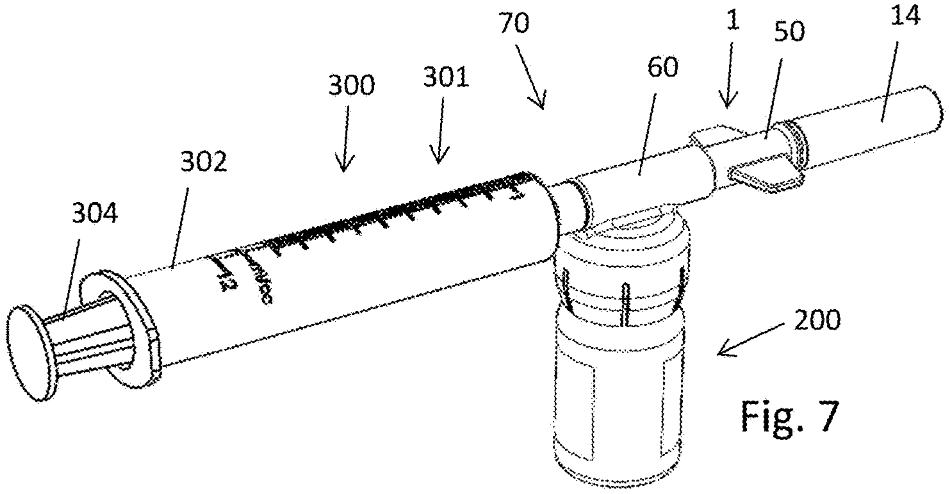
FIG. 7 shows the assembly of FIG. 6 further connected with a pump device.

As particularly illustrated in FIG. 7 the pump device 300 in form of a syringe 301 comprises an elongated or tubular shaped syringe barrel 302 and a movable plunger 304 in order to apply negative or positive pressure when connected to the fluid transfer device 1. The syringe barrel 302 may comprise a transparent material so as to allow a visual inspection of the fluid located inside the syringe barrel 302. The syringe barrel 302 may be further provided with a visual scale 306 by way of which the amount of the fluid located inside the syringe barrel 302 can be directly indicated. The scale 306 further provides a control of the amount of fluid to be withdrawn into the syringe barrel 302 as well as the amount of fluid to expelled from the syringe barrel 302 for withdrawing or supplying a well-defined or controllable amount of a fluid from and into the diluent container 100 as well as for controlling an amount of the fluid to be supplied into the medicament container 200 and to be withdrawn from the medicament container 200.

The fluid transfer device 1 as described herein provides a precise a controllable transfer of fluid between the diluent container 100, the medicament container 200 and the pump device 300 without the necessity to connect or to disconnect any of the components of the infusion kit 70 as illustrated in FIG. 9.

In the sequence of FIGS. 5-14 an intended use of the fluid transfer device 1 and/or of the infusion kit 70 is illustrated step-by-step.

Figure 5:
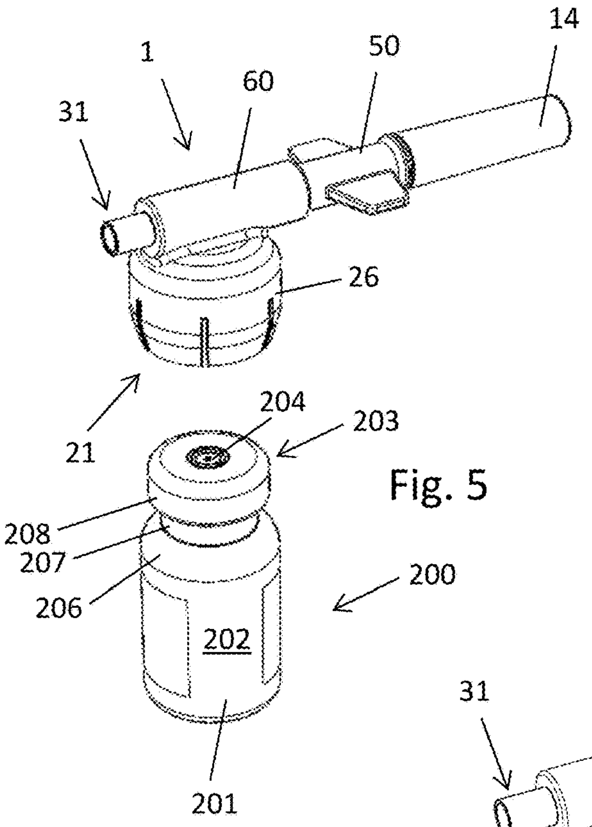
FIG. 5 shows the fluid transfer device and the medicament container during mutual assembly.
Figure 6:
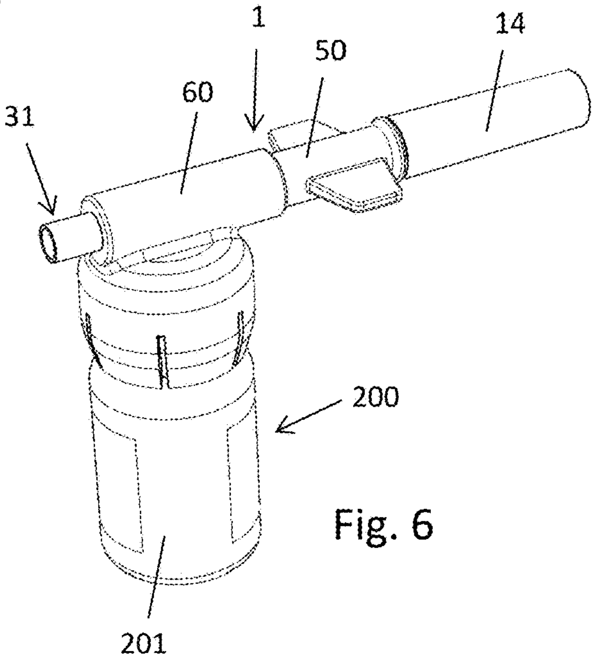
FIG. 6 shows the fluid transfer device connected to the medicament container.

In a first step there is provided the fluid transfer device 1 and the medicament container 200 as shown in FIG. 5. The second connecting portion 21 comprising the receptacle 25 is connectable to the barrel head 208 of the medicament container 200 to reach a configuration as illustrated in FIG. 6. Thereafter or before connecting or fixing the medicament container 200 and the fluid transfer device 1 the pump device 300 is connected to the third connecting portion 31 of the fluid transfer device 1. Thereafter a protective cap 14 of the fluid transfer device 1 initially covering or protecting a diluent container spike 12 is disconnected as shown in FIG. 8. Then and thereafter the fluid transfer device 1 is connected with its first connecting portion 11 to a diluent container 100, which in the presently illustrated example comprises a flexible bag 101.

Here, the diluent container spike 12 is engaged with one of the port structures 103, 105 of the diluent container 100. The port structure 103 may be provided with a pierceable seal 104 as indicated in FIG. 11, which pierceable seal 104 may be pierced or penetrated by the diluent container spike 12. Now and in the configuration of the infusion kit 70 as shown in FIG. 10 the first connecting portion 11 is connected to the diluent container 100. The second connecting portion 21 is connected to the medicament container 200 and the third connecting portion 31 is connected to the pump device 300.

The fluid transfer device 1 as shown in FIG. 10 is or may be switches into the first configuration as shown in FIG. 11. Then and by applying a negative pressure to the third fluid channel 30, e.g. by moving the plunger 304 in a direction away from the connecting portion 31 there can be applied a respective negative pressure, which leads to a withdrawal of a well-defined amount of a fluid from the diluent container 100 through the first fluid channel 10, through the first passageway 85 into the third fluid channel 30 and further into barrel 302 of the pump device 300. Thereafter, the plunger 304 is at least partially or entirely pushed back into the syringe barrel 302 thereby expelling a well-defined amount of a fluid back into the third fluid channel 30, which flow of fluid is then transferred into the second fluid channel 20 via the first passageway 85 and the first branch section 82.

This process may be repeated several times until a desired amount of diluent has been transferred into the interior 202 of the medicament container 200. Thereafter and upon completion of a reconstitution process or diluting process inside the medicament container 200 the first body part 50 may be rotated relative to the second body part 60, e.g. by 180° or by any other relative angle as defined by the relative outwardly directed orientation of the first branch section 82 and the second branch section 92 of the respective first and second transfer channels 80, 90.

For ease of operation the first body part 50 may be provided with two oppositely and radially outwardly extending flange portion 57, 58 by way of which a user may easily grip and apply a respective rotating torque onto the first body part 50 relative to the second body part 60. The first configuration and the second configuration of the fluid transfer device 1 may be further characterized by mutually corresponding stop features stop portions of the first body part 50 and the second body part 60 (not illustrated). The respective body parts 50, 60 may comprise mutually corresponding snap features, e.g., in form of recesses or protrusions by way of which the first body part 50 and the second body part 60 can be fixed relative to each other in one or both of the first configuration and the second configuration.

After having transferred an amount of the fluid into the medicament container 200 and after switching the fluid transfer device 1 from the first configuration into the second configuration the pump device 300 may be repeatedly used as in the first configuration. Here, and in the second configuration of the fluid transfer device 1 the medicament container 200 may be oriented upside down so as to obtain a permanent fluid connection between the free end of the medicament container spike 24 and hence of the second fluid channel 20 with the liquid or fluid fraction inside the interior 202 of the medicament container 200.

Figure 12:
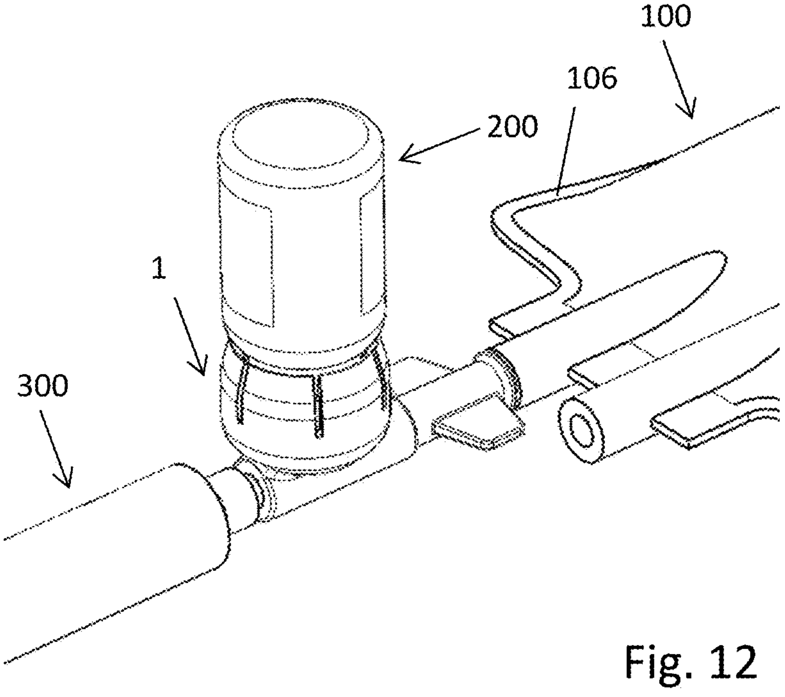
FIG. 12 shows the infusion kit with the fluid transfer device in the second configuration.
Figure 13:
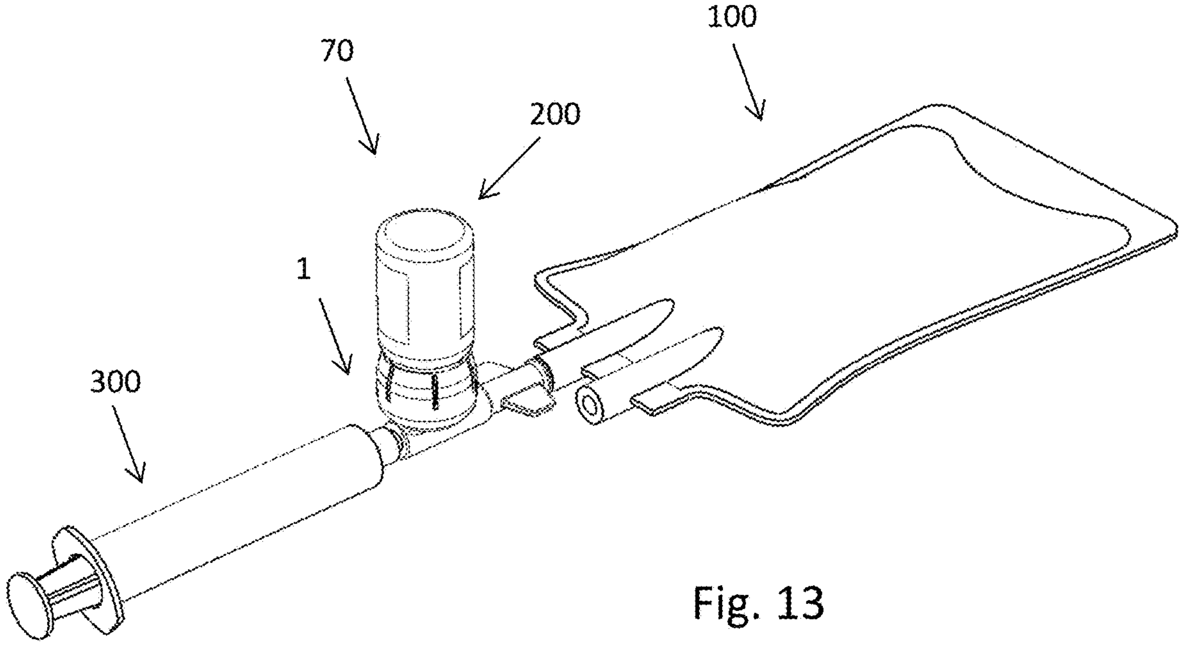
FIG. 13 shows the infusion kit after expelling of the fluid from the pump device.
Figure 14:
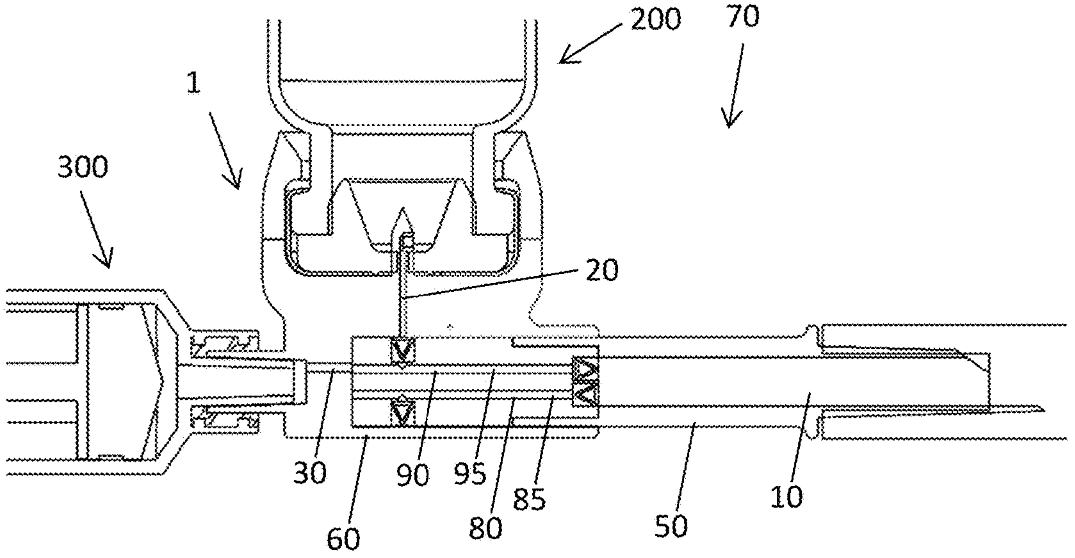
FIG. 14 shows a further longitudinal cross-section through the infusion kit and FIG. 15 is a flowchart of a method of transferring a fluid between a diluent container and a medicament container.

Then and as illustrated or indicated by FIGS. 12-14 moving of the plunger 304 in distal direction, so as to increase the interior volume of the syringe barrel 302 leads to the application of a negative pressure to the third fluid channel 30 by way of which a respective amount of fluid can be withdrawn from the interior 202 of the medicament container 200 through the second fluid channel 20, the second branch section 92, through the second passageway 95 towards the distal end 93 of the second passageway 95 and further into the third fluid channel 30 and still further into the pump device 300.

Subsequently, there may be applied a positive pressure, by pushing the plunger 304 into the syringe barrel 302 thereby applying a positive fluid pressure which then leads to a transfer of fluid into the second passageway 95, from the distal end 93 towards the proximal end 91 and further into the first fluid channel 10 and then back into the diluent container 100.

Figure 15:
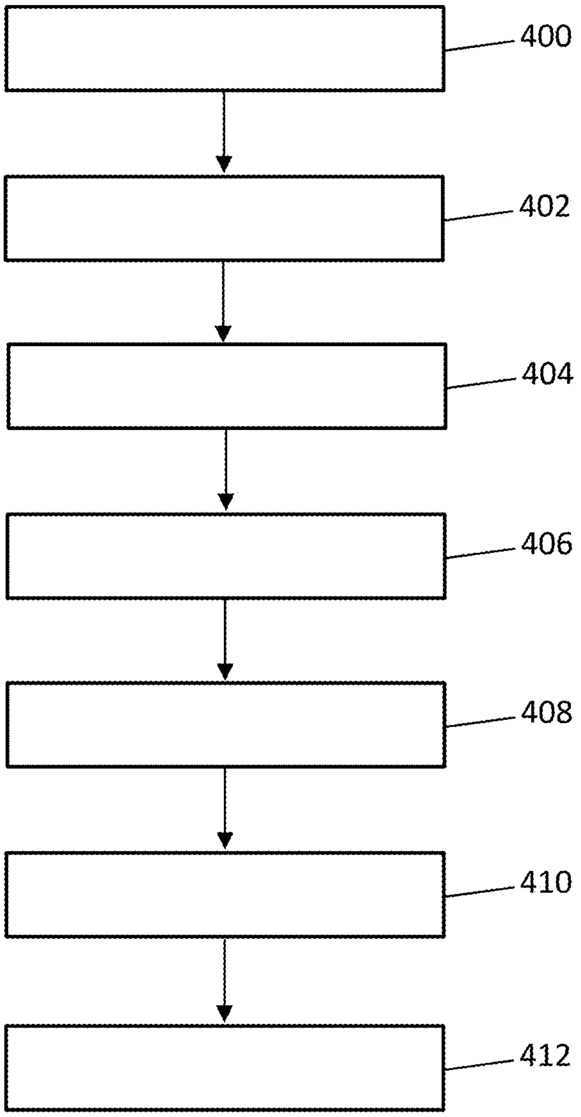

The flowchart according to FIG. 15 reflects numerous steps of conducting a method of transferring a fluid between the diluent container 100, the medicament container 200 or vice versa from or between the medicament container 200 and the diluent container 100. In a first step 400 the fluid transfer device 1 is used. In a subsequent step 402 the fluid transfer device 1 is duly connected with the medicament container 200, with the diluent container 100 and with the pump device 300. In step one 404 the infusion kit 70 is used with the fluid transfer device 1 in the first configuration. Here in a first step, a negative pressure is applied to the third fluid channel by way of which an amount of the fluid originally contained inside the diluent container 100 is transferred into the pump device 300. In a subsequent step 406 positive pressure is applied to the third fluid channel 30 by way of which a respective amount of the fluid now contained in the pump device 300 is expelled back and hence in opposite direction into the third fluid channel 30. In step 406 the respective amount of fluid is expelled from the pump device 300 is redirected or supplied into the medicament container 200.

After an optional mechanical treatment or reconstitution of the medicament located inside the medicament container 200 in step 408 the fluid transfer device 1 is switched from the first configuration into the second configuration. In the further step 410 there is again applied a negative pressure to the third fluid channel 30 by way of the pump device 300, which leads to a withdrawal of a fluid from the medicament container 200 through the third fluid channel 30 into the pump device 300. In a subsequent step 412 positive pressure is applied by the pump device 300 by way of which an amount of the fluid is expelled from the pump device 300 back into the third fluid channel 30, which is now fluidically connected or coupled to the first fluid channel 10.

Accordingly, a respective amount of a fluid previously withdrawn from the medicament container 200 is now expelled into the diluent container 100. Thereafter, the fluid transfer device 1 may be disconnected from the diluent container 100. The port structure 103 may reseal automatically as the diluent container spike 12 is removed from the pierceable seal 104. Thereafter, the additional port structure 105, e.g. provided with a standardized fluid transferring connector may be attached or coupled to an injection device, such as an injection needle, or an infusion line for administering the fluid inside the diluent container 100 or infusion container into biological tissue of a patient.

The invention claimed is:

1. A fluid transfer device for transferring a fluid between a diluent container and a medicament container, the fluid transfer device comprising:

a body;

a first connecting portion configured to connect to the diluent container, the first connecting portion comprising a first fluid channel to fluidically communicate with an interior of the diluent container;

a second connecting portion configured to connect to the medicament container, the second connecting portion comprising a second fluid channel to fluidically communicate with an interior of the medicament container;

a third fluid channel configured to fluidically communicate with a pump device;

wherein when the fluid transfer device is in a first configuration, the first fluid channel is fluidically coupled to the third fluid channel to support a flow of fluid from the first fluid channel into the third fluid channel, and the third fluid channel is fluidically coupled to the second fluid channel to support a flow of fluid from the third fluid channel into the second fluid channel, and to prevent a flow of fluid from the third fluid channel into the first fluid channel; and wherein when the fluid transfer device is in a second configuration, the second fluid channel is fluidically coupled to the third fluid channel to support a flow of fluid from the second fluid channel into the third fluid channel, and the third fluid channel is fluidically coupled to the first fluid channel to support a flow of fluid from the third fluid channel into the first fluid channel and to prevent a flow of fluid from the third fluid channel into the second fluid channel.

2. The fluid transfer device according to claim 1, wherein the body comprises a first body part and a second body part movable relative to each other to transfer the fluid transfer device between the first configuration and the second configuration.

3. The fluid transfer device according to claim 2, wherein the first body part defines a longitudinal axis and wherein the second body part is rotatable relative to the first body part with the longitudinal axis as an axis of rotation.

4. The fluid transfer device according to claim 2, wherein the first body part comprises the first fluid channel and wherein the second body part comprises at least one of the second fluid channel or the third fluid channel.

5. The fluid transfer device according to claim 2, wherein the body further comprises a first transfer channel, wherein the first transfer channel comprises:

a first passageway comprising a proximal end merging into the first fluid channel and a distal end connectable to the third fluid channel, and a first branch section merging into the first passageway and connectable to the second fluid channel.

6. The fluid transfer device according to claim 5, wherein the first body part comprises the first transfer channel.

7. The fluid transfer device according to claim 6, wherein when the fluid transfer device is in the first configuration, the distal end of the first passageway is in flow connection with the third fluid channel and the first branch section is in flow connection with the second fluid channel.

8. The fluid transfer device according to claim 2, wherein the body comprises a second transfer channel, wherein the second transfer channel comprises:

a second passageway comprising a proximal end merging into the first fluid channel and a distal end connectable to the third fluid channel, and a second branch section merging into the second passageway and connectable to the second fluid channel.

9. The fluid transfer device according to claim 8, wherein the first body part comprises the second transfer channel.

10. The fluid transfer device according to claim 9, wherein when the fluid transfer device is in the second configuration, the proximal end of the second passageway is in flow connection with the third fluid channel and the second branch section is in flow connection with the second fluid channel.

11. The fluid transfer device according to claim 1, comprising at least one of (a) or (b), (a) wherein the first connecting portion comprises a diluent container spike configured to penetrate a pierceable seal of the diluent container and wherein the first fluid channel extends into or through the diluent container spike; or (b) wherein the second connecting portion comprises a medicament container spike configured to penetrate a pierceable seal of the medicament container.

12. The fluid transfer device according to claim 1, wherein the body comprises a third connecting portion fluidically coupled to the third fluid channel, the third connecting portion comprises a mechanical connector configured to connect with a mechanical counter connector of the pump device in a fluid transferring manner.

13. A kit comprising:

a fluid transfer device comprising:

a body;

a diluent container;

a medicament container;

a pump device;

a first connecting portion configured to connect to the diluent container, the first connecting portion comprising a first fluid channel to fluidically communicate with an interior of the diluent container;

a second connecting portion configured to connect to the medicament container, the second connecting portion comprising a second fluid channel to fluidically communicate with an interior of the medicament container; and a third fluid channel configured to fluidically communicate with the pump device;

wherein when the fluid transfer device is in a first configuration, the first fluid channel is fluidically coupled to the third fluid channel to support a flow of fluid from the first fluid channel into the third fluid channel, and the third fluid channel is fluidically coupled to the second fluid channel to support a flow of fluid from the third fluid channel into the second fluid channel, and to prevent a flow of fluid from the third fluid channel into the first fluid channel; and wherein when the fluid transfer device is in a second configuration, the second fluid channel is fluidically coupled to the third fluid channel to support a flow of fluid from the second fluid channel into the third fluid channel, and the third fluid channel is fluidically coupled to the first fluid channel to support a flow of fluid from the third fluid channel into the first fluid channel and to prevent a flow of fluid from the third fluid channel into the second fluid channel.

* * * * *